US007167420B2

(12) United States Patent
Endo et al.

(10) Patent No.: US 7,167,420 B2
(45) Date of Patent: Jan. 23, 2007

(54) TIMEPIECE INCLUDING BASE PLATE FORMED OF RESIN AND WHEEL TRAIN

(75) Inventors: Morinobu Endo, Suzaka (JP); Tetsuo Uchiyama, Tokyo (JP); Akio Yamaguchi, Kasugai (JP); Yasuo Kondo, Toyota (JP); Hiroshi Aoyama, Nagoya (JP); Koichiro Jujo, Kisarazu (JP); Kazutoshi Takeda, Sakura (JP); Masato Takenaka, Misato (JP); Shigeo Suzuki, Ichikawa (JP); Takeshi Tokoro, Tokyo (JP)

(73) Assignees: Kitagawa Industries Co., Ltd, Aichi-ken (JP); Seiko Instruments Inc., Chiba-ken (JP)

( * ) Notice: Subject to any disclaimer, the term of this patent is extended or adjusted under 35 U.S.C. 154(b) by 107 days.

(21) Appl. No.: 10/499,450

(22) PCT Filed: Dec. 20, 2002

(86) PCT No.: PCT/JP02/13389

§ 371 (c)(1), (2), (4) Date: Mar. 23, 2005

(87) PCT Pub. No.: WO03/054636

PCT Pub. Date: Jul. 3, 2003

(65) Prior Publication Data

US 2006/0164925 A1 Jul. 27, 2006

(30) Foreign Application Priority Data

Dec. 21, 2001 (JP) ............................ 2001-390278

(51) Int. Cl.

| | |
|---|---|
| ***G04F 5/00*** | (2006.01) |
| ***G04B 29/00*** | (2006.01) |
| ***F03G 1/00*** | (2006.01) |
| ***B32B 9/00*** | (2006.01) |
| ***C08K 3/00*** | (2006.01) |

(52) U.S. Cl. ...................... 368/160; 368/318; 368/324; 185/37; 428/367; 428/408; 523/468; 524/424; 977/724; 977/734

(58) Field of Classification Search ................. 368/88, 368/160, 280, 318, 322–323; 185/37
See application file for complete search history.

(56) References Cited

U.S. PATENT DOCUMENTS 4,711,584 A * 12/1987 Tanazawa et al. ............ 368/88

(Continued)

FOREIGN PATENT DOCUMENTS

EP 0206600 12/1986

(Continued)

OTHER PUBLICATIONS

English Translation of Written Opinion of the International Searching Authority.

(Continued)

*Primary Examiner*—Vit W. Miska
(74) *Attorney, Agent, or Firm*—Grossman, Tucker, Perreault & Pfleger PLLC

(57) ABSTRACT

The invention relates to a timepiece which has a resin substrate, rotors, and wheel trains, and relates to a wheel train apparatus which has a resin substrate, bearing members, gear wheel, and the like. The invention is constituted by a timepiece comprising; a gear wheel, and a substrate which supports a shaft of a rotor and/or a shaft of the gear wheel, the substrate being formed from a filled resin. Alternatively the invention is constituted by a wheel train apparatus comprising: a gear wheel; a substrate which supports one shaft section of the gear wheel, and a bridge which rotatably supports an other shaft section of the gear wheel, the substrate and the bridge being formed from a filled resin.

14 Claims, 11 Drawing Sheets

U.S. PATENT DOCUMENTS

| | | | | |
|---|---|---|---|---|
| 4,777,204 | A | 10/1988 | Ikenaga et al. | 524/439 |
| 4,858,210 | A * | 8/1989 | Yamada et al. | 368/238 |
| 5,545,686 | A * | 8/1996 | Carter et al. | 524/513 |
| 6,426,134 | B1 * | 7/2002 | Lavin et al. | 428/300.1 |
| 2001/0030908 | A1 * | 10/2001 | Moteki et al. | 368/140 |
| 2003/0231557 | A1 * | 12/2003 | Nakajima et al. | 368/281 |

FOREIGN PATENT DOCUMENTS

| | | |
|---|---|---|
| JP | 53-138870 | 2/1978 |
| JP | 58-56989 | 4/1983 |
| JP | 58084258 | 5/1983 |
| JP | 61285249 | 12/1986 |
| JP | 62-162687 | 10/1987 |
| JP | 3064367 | 3/1991 |
| JP | 3081370 | 4/1991 |
| JP | 07-229975 | 11/1994 |
| JP | 11094956 | 4/1999 |
| JP | 11281762 | 10/1999 |
| KR | 9406469 | 7/1994 |

OTHER PUBLICATIONS

English Translation of the International Preliminary Examination Report dated Oct. 14, 2004.

International Search Report dated Feb. 4, 2003.

* cited by examiner

TIMEPIECE INCLUDING BASE PLATE FORMED OF RESIN AND WHEEL TRAIN

TECHNICAL FIELD

The present invention relates to a timepiece which has a resin substrate, rotors, and gear wheels, for example, an analog electronic timepiece and a mechanical timepiece. Moreover, the present invention relates to a wheel train apparatus which has a resin substrate, bearing members, gear wheels, and the like.

BACKGROUND ART

Conventionally, in a timepiece including a wheel train which rotates by driving a motor, for example, in an analog electronic timepiece, a wheel train is rotated by driving a rotor constituting a step motor. For example, gear wheels such as a fifth wheel-and-pinion, a fourth wheel-and-pinion, a third wheel-and-pinion, and a minute indicator, constitute the wheel train. Rotor pinion (in a rotor this refers to parts other than the rotor magnet, and similarly hereunder), the fifth wheel-and-pinion, and the third wheel-and-pinion may be formed from a metal, or may be formed from a so-called engineering plastic such as polyacetal.

Moreover, conventionally, in a timepiece including a wheel train which rotates by the force of a mainspring, for example, in a mechanical timepiece, the wheel train is rotated by rotation of a barrel drum including mainsprings. For example, gear wheels such as a barrel complete, a second wheel-and-pinion, a third wheel-and-pinion, a fourth wheel-and-pinion, and an escape wheel-and-pinion constitute a wheel train. A gear wheel has a gear wheel section and a shaft section. A main plate, a wheel train bridge, and a second bridge are provided with bearing section. The shaft section of the gear wheel is rotatably supported by the bearing section. The third wheel-and-pinion and the fourth wheel-and-pinion may be formed from a metal, or may be formed from a so called engineering plastic such as polyacetal.

The main plate constitutes the substrate of the analog electronic timepiece and the mechanical timepiece. The wheel train bridge and the second bridge constitute the bearing members of the analog electronic timepiece and the mechanical timepiece. The main plate, the wheel train bridge, and the second bridge may be formed from a metal such as brass, or a so-called engineering plastic such as polycarbonate.

However, in a timepiece including plastic parts such as a rotor, a fifth wheel-and-pinion, a fourth wheel-and-pinion, and a third wheel-and-pinion formed from engineering plastics, in the case where the plastic parts are transported by a parts feeder, the plastic parts may become charged in some cases due to friction. Referring to FIG. 9, if a charged plastic part, for example a plastic rotor 876 is held by a metal chuck 880, the charged negative electrode (−) in the chuck 880 and the charged negative electrode (−) in the rotor 876 become mutually repulsive (or, the charged positive electrode (+) in the chuck 880 and the charged positive electrode (+) in the rotor 876 become mutually repulsive), so that the rotor 876 is likely to move or jump out in the direction of the arrow.

Referring to FIG. 10, a movement (machine body) 800 of the analog electronic timepiece includes a main plate 802 and a stator 874. In the movement (machine body) 800 of the analog electronic timepiece, if the charged rotor 876 is combined with the main plate 802, the charged positive electrode (+) in the main plate 802 and the charged positive electrode (+) in the rotor 876 become mutually repulsive (or, the charged negative electrode (−) in the main plate 802 and the charged negative electrode (−) in the rotor 876 become mutually repulsive), so that the rotor 876 is likely rise in the direction of the arrow and jump. As a result, the shaft section of the rotor 876 can not be located in a predetermined position. If the wheel train bridge 812 is combined with the main plate 802 in such condition, the shaft section of the rotor 876 may be bent, or the shaft section of the rotor 876 may be damaged.

Furthermore, referring to FIG. 11, when the charged rotor 876 is lubricated with lubricating oil (chronometer oil: shown by hatching in FIG. 11) using a lubricating unit 888, if the lubricating unit 888 becomes close to the charged rotor 876, the non-conductive lubricating oil becomes polarized and charged. Therefore, there is the likelihood of the droplets of the lubricating oil being not only adhered to the parts of the rotor 876 requiring the lubricating oil, for example, the shaft in FIG. 11, but also being dispersed and adhered to the unnecessary parts, for example, the pinion section other than the shaft section of the rotor 876 or the like.

Therefore, heretofore there is a problem in that antistatic agent must be sprayed on the plastic parts such as the rotor pinion, the fifth wheel-and-pinion, the fourth wheel-and-pinion and the third wheel-and-pinion. Moreover it has heretofore been necessary to earth to the various parts manufacturing machines or assembling machines

DISCLOSURE OF INVENTION

The timepiece of the present invention includes: a motor constituting a driving source, the motor including a rotor having a pinion section and a shaft section, a gear wheel configured so as to rotate by rotation of the rotor, the gear wheel having a gear wheel section and a shaft section, and a substrate including a bearing section which rotatably supports the shaft section of the rotor and/or the shaft section of the gear wheel, wherein the substrate is formed from a filled resin having a base resin of thermoplastic resin and carbon fiber mixed with this base resin.

In the timepiece of the present invention, the substrate is formed from a filled resin having a base resin of thermoplastic resin and carbon fiber mixed with this base resin. Since this filled resin has conductivity, the main plate formed from the filled resin will not become charged. Therefore, due to the present invention, the plastic parts can be held by the chuck without spraying antistatic agent on the plastic parts such as the rotor, the fifth wheel-and-pinion, the fourth wheel-and-pinion and the third wheel-and-pinion. In the timepiece of the present invention, the plastic parts can be reliably fitted into the substrate. Furthermore, in the timepiece of the present invention; when the plastic parts such as the rotor, the main plate, or the bridge are lubricated with lubricating oil (oil for timepiece) using a lubricating unit, there is little likelihood of droplets of the lubricating oil not being adhered to the parts requiring the lubricating oil, for example, the bearings of the shaft section or the bore, and being dispersed and adhered to the parts not requiring the lubricating oil, for example, the pinion section.

Furthermore, the timepiece of the present invention includes: a motor constituting a driving source, the motor including a rotor having a pinion section and a shaft section, a gear wheel configured so as to rotate by rotation of the rotor, the gear wheel having a gear wheel section and a shaft section, and a substrate including a bearing section which rotatably supports the shaft section of the rotor and/or the shaft section of the gear wheel, wherein the substrate is formed from a metal or a plastic, and the rotor and/or the gear wheel are formed from a filled resin having a base resin of thermoplastic resin and carbon fiber mixed with this base resin.

Moreover, the timepiece of the present invention includes: a motor constituting a driving source, the motor including a rotor having a pinion section and a shaft section, a gear wheel configured so as to rotate by rotation of the rotor, the gear wheel having a gear wheel section and a shaft section, and a substrate including a bearing section which rotatably supports the shaft section of the rotor and/or the shaft section of the gear wheel, wherein the substrate is formed from a filled resin having a base resin of thermoplastic resin and carbon fiber mixed with this base resin, and the rotor and/or the gear wheel are formed from a filled resin having a base resin of thermoplastic resin and carbon fiber mixed with this base resin.

Furthermore, the timepiece of the present invention includes: a spiral spring constituting a driving source; a gear wheel configured so as to rotate with the spiral spring as the driving source, the gear wheel having a gear wheel section and a shaft section, and a substrate including a bearing section which rotatably supports the shaft section of the gear wheel, wherein the substrate is formed from a filled resin having a base resin of thermoplastic resin and carbon fiber mixed with this base resin.

Moreover, the timepiece of the present invention includes: a spiral spring constituting a driving source, a gear wheel configured so as to rotate with the spiral spring as the driving source; the gear wheel having a gear wheel section and a shaft section, and a substrate including a bearing section which rotatably supports the shaft section of the gear wheel, wherein the substrate is formed from a metal or a plastic, and the gear wheel is formed from a filled resin having a base resin of thermoplastic resin and carbon fiber mixed with this base resin.

Furthermore, the timepiece of the present invention includes: a spiral spring constituting a driving source, a gear wheel configured so as to rotate with the spiral spring as the driving source, the gear wheel having a gear wheel section and a shaft section, and a substrate including a bearing section which rotatably supports the shaft section of the gear wheel, wherein the substrate is formed from a filled resin having a base resin of thermoplastic resin and carbon fiber mixed with this base resin, and the gear wheel is formed from a filled resin having a base resin of thermoplastic resin and carbon fiber mixed with this base resin.

In the timepiece of the present invention, preferably the base resin is selected from a group consisting of; polystyrene, polyethylene terephthalate, polycarbonate, polyacetal (polyoxymethylene), polyamide, modified polyphenylene ether, polybutylene terephthalate, polyphenylene sulfide, polyether ether ketone, and polyether imide. Furthermore, in the timepiece of the present invention, preferably the carbon filler is selected from a group consisting of; a monolayer carbon nanotube, a multilayer carbon nanotube, a vapor grown carbon fiber, a nanografiber, a carbon nanohorn, a cup stack type carbon nanotube, a monolayer fullerene, a multilayer fullerene, and a mixture of any one of the carbon fillers doped with boron.

Moreover, the present invention is a wheel train apparatus including a gear wheel, a substrate, and a bearing member, including: a gear wheel having a gear wheel section and a shaft section; a substrate including a bearing section which rotatably supports one shaft section of the gear wheel; and a bearing member including a bearing section which rotatably supports an other shaft section of the gear wheel, wherein the substrate and the bearing member are formed from a filled resin having a base resin of thermoplastic resin and carbon fiber mixed with this base resin.

By such a configuration, it is possible to provide a wheel train apparatus configured such that, without spraying antistatic agent on the gear wheels such as the fifth wheel-and-pinion, the fourth wheel-and-pinion, the third wheel-and-pinion, and an transfer wheel, these parts can be held by the chuck, and these parts can be reliably fitted into the substrate.

Furthermore, the present invention is a wheel train apparatus including a gear wheel, a substrate, and a bearing member, includes a gear wheel having a gear wheel section and a shaft section; a substrate including a bearing section which rotatably supports one shaft section of the gear wheel; and a bearing member including a bearing section which rotatably supports an other shaft section of the gear wheel, wherein the substrate is formed from a metal or a plastic, the bearing member is formed from a metal or a plastic, and the gear wheel is formed from a filled resin having a base resin of thermoplastic resin and carbon fiber mixed with this base resin.

Moreover, the present invention is a wheel train apparatus including a gear wheel, a substrate, and a bearing member, including: a gear wheel having a gear wheel section and a shaft section; a substrate including a bearing section which rotatably supports one shaft section of the gear wheel; and a bearing member including a bearing which rotatably supports an other shaft section of the gear wheel, wherein the substrate and the bearing member are formed from a filled resin having a base resin of thermoplastic resin and carbon fiber mixed with this base resin, and the gear wheel is formed from a filled resin having a base resin of thermoplastic resin and carbon fiber mixed with this base resin.

In the wheel train apparatus of the present invention, preferably the base resin is selected from a group consisting of any one of; polystyrene, polyethylene terephthalate, polycarbonate, polyacetal (polyoxymethylene), polyamide, modified polyphenylene ether, polybutylene terephthalate, polyphenylene sulfide, polyether ether ketone, and polyether imide. Moreover, in the wheel train apparatus of the present invention, preferably the carbon filler is selected from a group consisting of; a monolayer carbon nanotube, a multilayer carbon nanotube, a vapor grown carbon fiber, a nanografiber, a carbon nanohorn, a cup stack type carbon nanotube, a monolayer fullerene, a multilayer fullerene, and a mixture of any one of the carbon fillers doped with boron.

In the present invention, “substrate” is not limited to the main plate, but is a concept including seat members such as a third lower seat, plate members such as a calendar back plate, presser members such as a back holder and date dial guard, and frame members such as a winder frame and a battery frame. Moreover, in the present invention, “bearing member” is a concept including bridge such as a second bridge, a third bridge and a wheel train bridge. That is, in the present invention, “substrate” and “bearing member” denote various members provided with bearings which rotatably support the rotating members such as the gear wheel, the rotor, or the like.

Figure 1:
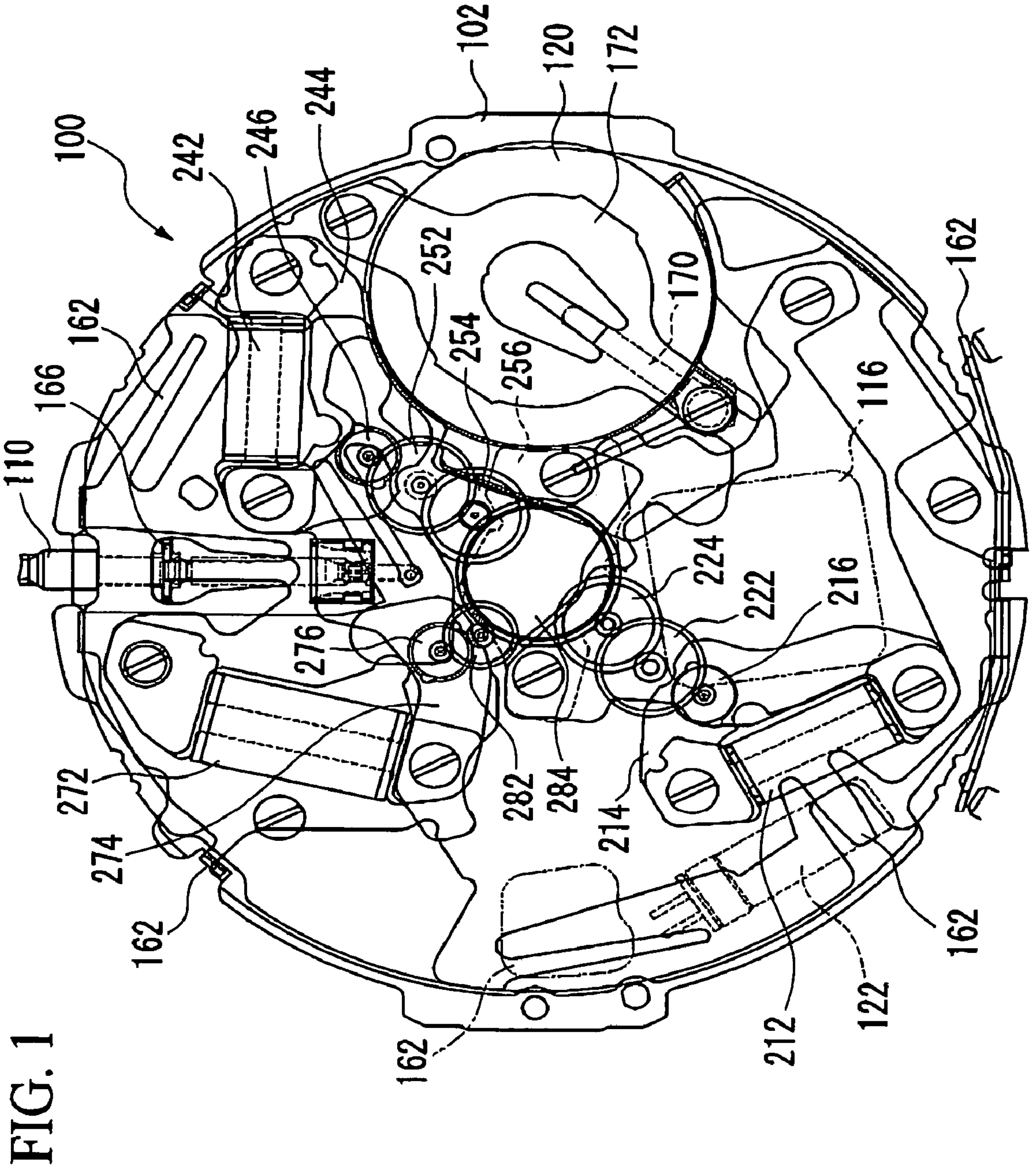
FIG. 1 is a plan view showing a schematic configuration of a movement seen from the observe side, in a first embodiment of the present invention (some components are omitted in FIG. 1).

BEST MODE FOR CARRYING OUT THE INVENTION (First Embodiment)

First is the description of a first embodiment of the present invention. The first embodiment of the present invention is a timepiece having a rotor and a wheel train, that is, an analog electronic timepiece. Referring to FIG. 1 to FIG. 4, in the first embodiment of the analog electronic timepiece of the present invention, a movement (machine body) 100 of the analog electronic timepiece has a main plate 102 constituting a substrate of the movement. A hand setting stem 110 is rotatably built in to a hand setting stem guiding hole of the main plate 102. A dial 104 (denoted by imaginary lines in FIG. 2) is attached to the movement 100. The movement 100 is provided with a changeover spring 166 which determines the position in the axial direction of the hand setting stem 110.

On the "observe side" of the movement 100, a battery 120, a circuit block 116, an hour motor 210, an hour display wheel train 220, a minute motor 240, a minute display wheel train 250, a second motor 270, a second display wheel train 280, and the like are arranged. The main plate 102, a wheel train bridge 112, a second bridge 114 constitute support members. The configuration is such that rotation of the hour motor 210 cause rotation of the hour display wheel train 220 so that the hour hand 230 can display the "hour" of the present time. Moreover, the configuration is such that rotation of the minute motor 240 cause rotation of the minute display wheel train 250 so that the minute hand 260 can display the "minute" of the present time. Furthermore, the configuration is such that rotation of the second motor 270 cause rotation of the second display wheel train 280 so that the second hand 290 can display the "second" of the present time.

An IC 118 and a quartz resonator 122 are installed in the circuit block 116. The circuit block 116 is fixed with respect to the main plate 102 and the wheel train bridge 112 by a switch spring 162 through an insulating plate 160. The changeover spring 166 is integrally formed with the switch spring 162. The battery 120 constitutes the power source of the analog electronic timepiece. A rechargeable secondary battery or a rechargeable capacitor may be also used for the power source of the analog electronic timepiece. The quartz resonator 122 constitutes the oscillation source of the analog electronic timepiece. It oscillates for example at 32,768 Hertz.

Figure 2:
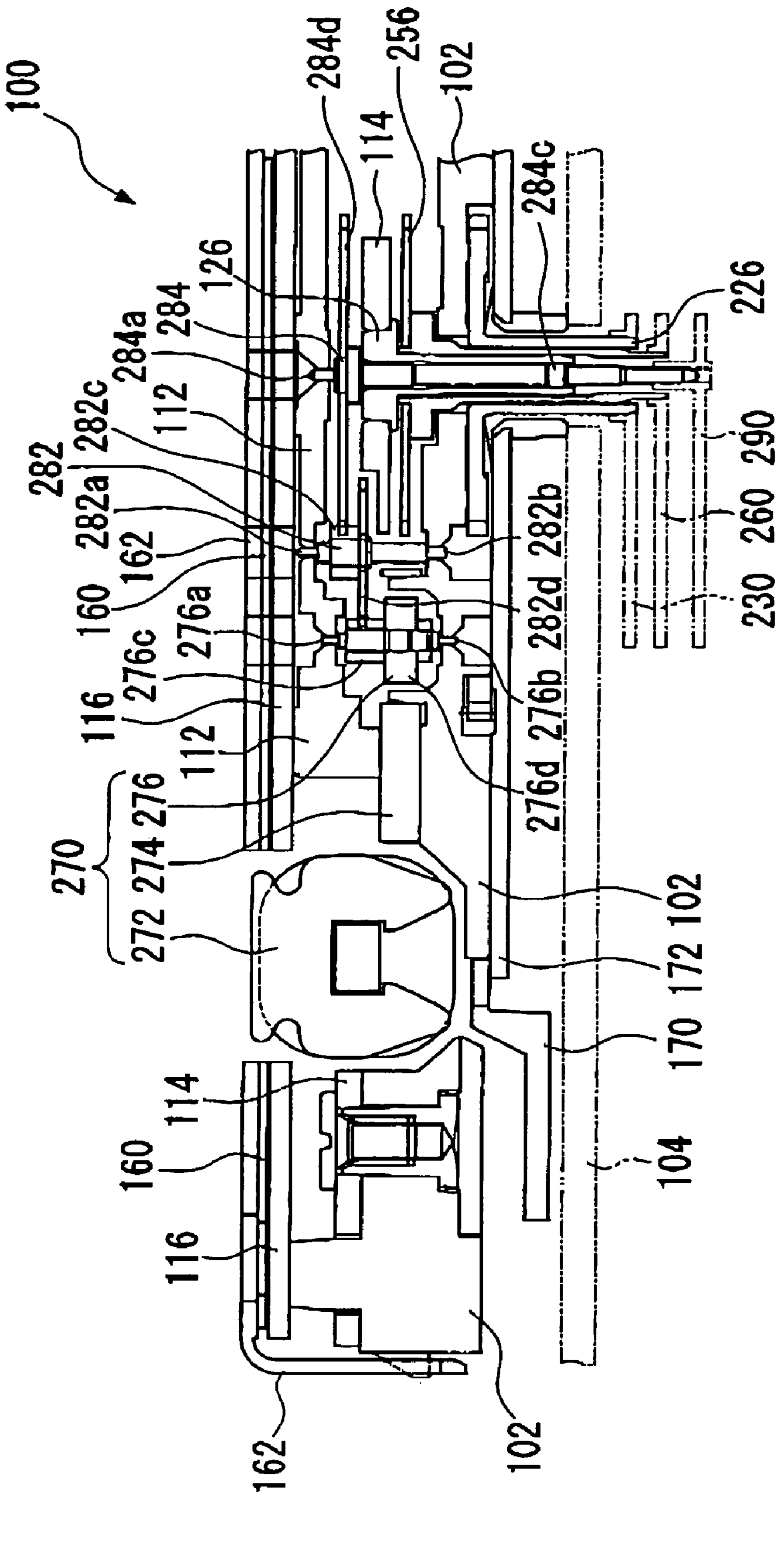
FIG. 2 is a schematic fragmentary sectional view showing a part from a second motor to a second hand, in the first embodiment of the present invention.

Referring to FIG. 1 and FIG. 2, a second motor 270 includes a second coil block 272, a second stator 274, and a second rotor 276. When the second coil block 272 inputs a second motor drive signal, the second stator 274 is magnetized to rotate the second rotor 276. The second rotor 276 is configured for example so that it rotates 180 degrees for every second. The second rotor 276 includes an upper-shaft section **276*a*, a lower-shaft section 276*b*, a pinion section 276*c*, and a rotor magnet 276*d*. The upper-shaft section 276*a*, the lower-shaft section 276*b*, and the pinion section 276*c*** are formed from a so-called engineering plastic such as polyacetal.

The configuration is such that, based on rotation of the second rotor 276, a second wheel 284 rotates through rotation of a second transfer wheel 282. The second transfer wheel 282 includes an upper-shaft section **282*a*, a lower-shaft section 282*b*, a pinion section 282*c*, and a gear wheel section 282*d*. The pinion section 276*c* is configured so that it meshes with the gear wheel section 282*d*. The second transfer wheel 282 is formed from a so-called engineering plastic such as polyacetal. The second wheel 284 is configured for example so that it rotates once per minute. The second wheel 284 includes an upper-shaft 284*a*, a bead section 284*b*, and a gear wheel section 284*d*. The pinion section 282*c* is configured so that it meshes with the gear wheel section 284*d*. The upper-shaft section 284*a* and the bead section 284*b* are formed from a metal such as carbon steel. The gear wheel sections 284*d*** is formed from a metal such as brass.

The second hand 290 is attached to the second wheel 284. The second wheel 284 may be arranged at the center of the analog electronic timepiece, or may be arranged in a different location from the center of the analog electronic timepiece. The second hand 290 constitutes a second display member. Any one of a second hand, a disk, and other display members in floral or geometric patterns may be used for the second display member. The second display wheel train 220 includes the second transfer wheel 282 and the second wheel 284. The second rotor 276 and the second transfer wheel 282 are rotatably supported with respect to the main plate 102 and the wheel train bridge 112. The second wheel 284 is rotatably supported with respect a center pipe 126 provided on the second bridge 114 and the wheel train bridge 112. That is, the upper-shaft section **276*a* of the second rotor 276, the upper-shaft section 282*a* of the second transfer wheel 282, and the upper-shaft section 284*a* of the second wheel 284 are rotatably supported with respect to the wheel train bridge 112. Moreover, the lower-shaft section 276*b* of the second rotor 276 and the lower-shaft section 282*b* of the second transfer wheel 282 are rotatably supported with respect to the main plate 102**.

A bearing of the wheel train bridge 112 which rotatably supports the upper-shaft section **276*a* of the second rotor 276, a bearing of the wheel train bridge 112 which rotatably supports the upper-shaft section 282*a* of the second transfer wheel 282, and a bearing of the wheel train bridge 112 which rotatably supports the upper-shaft section 284***a* of the second wheel 284, are lubricated with lubricating oil. A bearing of the main plate 102 which rotatably supports the lower-shaft section 276*b* of the second rotor 276, and a bearing of the main plate 102 which rotatably supports the lower-shaft section 292*b* of the second transfer wheel 282, are lubricated with lubricating oil. For this lubricating oil, it is preferable to use precision instrument oil, and it is particularly preferable to use so-called chronometer oil. Examples of such chronometer oil include "MOEBIUS A (trademark)" available from MOEBIUS Co, Ltd.

In order to increase the retention capacity of the lubricating oil, it is preferable to provide the respective bearings of the wheel train bridge 112 and the respective bearings of the main plate 102, with sump sections of cone, cylindrical, or truncated cone shape. If the sump section is provided, the lubricating oil can be effectively prevented from spreading by the surface tension of the oil. A date dial 170 is rotatably supported with respect to the main plate 102. A date dial guard 172 supports the date dial 170 with respect to the main plate 102. It is preferable to lubricate the attachment part of the tip section of the date dial 170 and the main plate 102 with the lubricating oil. For this lubricating oil, it is preferable to use precision instrument oil, and it is particularly preferable to use so-called chronometer oil.

The main plate 102 and the wheel train bridge 112 are formed from a filled resin having a base resin of thermoplastic resin and carbon fiber mixed with this base resin. If the main plate 102 and the wheel train bridge 112 are formed from the filled resin, the lubricating oil can be effectively held due to the filler. Therefore the likelihood of the lubricating oil being scattered without being retained by the bearings can be reduced. Consequently, the timepiece and the wheel train apparatus of the present invention having the wheel train, have good durability performance for the shaft and bearings, and ease of maintenance.

The base resin used in the present invention is generally polystyrene, polyethylene terephthalate, polycarbonate, polyacetal (polyoxymethylene), polyamide, modified polyphenylene ether, polybutylene terephthalate, polyphenylene sulfide, polyether ether ketone, or polyether imide. That is, in the present invention, the base resin is preferably made of a so-called general-purpose engineering plastic or a so-called super engineering plastic. In the present invention, a general-purpose engineering plastic or a super engineering plastic other than the above can also be used for the base resin. It is preferable that the base resin used for the present invention is a thermoplastic resin.

The carbon filler used in the present invention is generally; a monolayer carbon nanotube, a multilayer carbon nanotube, a vapor grown carbon fiber, a nanografiber, a carbon nanohorn, a cup stack type carbon nanotube, a monolayer fullerene, a multilayer fullerene, or the aforementioned carbon fillers doped with boron. Preferably the carbon filler is contained as 0.2 to 60% by weight of the total weight of the filler containing resin. Or preferably the carbon filler is contained as 0.1 to 30% by volume of the total volume of the filler containing resin.

Preferably the monolayer carbon nanotube has a diameter of 0.4 to 2 nm, and an aspect ratio (length/diameter) of 10 to 1000, specifically an aspect ratio of 50 to 100. The monolayer carbon nanotube is formed in a hexagon shaped netlike having a cylindrical shape or a truncated-cone shape, and is a monolayer structure. The monolayer carbon nanotube can be obtained from Carbon Nanotechnologies Inc. (CNI) in the U.S.A. as "SWNT".

Preferably the multilayer carbon nanotube has a diameter of 2 to 100 nm, and an aspect ratio of 10 to 1000, specifically an aspect ratio of 50 to 100. The multilayer carbon nanotube is formed in a hexagon shaped netlike having a cylindrical shape or a truncated-cone shape, and is a multilayer structure. The multilayer carbon nanotube can be obtained from NIKKISO as "MWNT".

Such carbon nanotubes are described in "Carbon Nanotubes and Accelerated Electronic Applications" ("Nikkei Science" March, 2001 issue, pp 52–62) and "The Challenge of Nano Materials" ("Nikkei Mechanical" December, 2001 issue, pp 36–57) by P. G. Collins et. al., or the like. Moreover, the configuration and the manufacturing method of carbon fiber-containing resin composition has been disclosed for example in Japanese Unexamined Patent Application, First Publication No. 2001-200096.

Preferably the vapor grown carbon fiber has a diameter of 50 nm to 200 nm, and an aspect ratio of 10 to 1000, specifically an aspect ratio of 50 to 100. The vapor grown carbon fiber is formed in a hexagon shaped netlike having a cylindrical shape or a truncated-cone shape, and is a multilayer structure. The vapor grown carbon fiber can be obtained from SHOWA DENKO as "VGCF (trademark)". The vapor grown carbon fiber has been disclosed for example in Japanese Unexamined Patent Application, First Publication No. H05-321039, Japanese Unexamined Patent Application, First Publication No. H07-150419, and Japanese Examined Patent Application, second Publication No. H03-61768.

Preferably the nanografiber has an outer diameter of 2 to 500 nm, and an aspect ratio of 10 to 1000, an aspect ratio of 50 to 100 being particularly preferable. The nanografiber has an almost solid cylindrical shape. The nanografiber can obtained from ISE ELECTRON/now changed to NORITAKE ITRON CORP.

Preferably the carbon nanohorn has a diameter of 2 to 500 nm, and an aspect ratio of 10 to 1000, an aspect ratio of 50 to 100 being particularly preferable. The carbon nanohorn has an cup shape being a hexagon shaped netlike.

Preferably the cup stack type carbon nanotube has a shape where the carbon nanohorn is laminated into a cup shape, and an aspect ratio of 10 to 1000, an aspect ratio of 50 to 100 being particularly preferable.

Fullerene is a molecule which uses a carbon cluster as a parent. The definition of CAS, is that it is a molecule being a closed globular shape with 20 or more carbon atoms respectively combined with adjacent three atoms. Monolayer fullerene has a football like shape. Preferably the monolayer fullerene has a diameter of 0.1 to 500 nm. Preferably the composition of the monolayer fullerene is C60 to C540. the monolayer fullerene is for example C60, C70, and C120. The diameter of C60 is about 0.7 nm. Multilayer fullerene has a telescopic shape with the monolayer fullerene mentioned above concentrically laminated. Preferably the multilayer fullerene has a diameter of 0.1 nm to 1000 nm, a diameter of 0.1 nm to 500 nm being particularly preferable. Preferably the multilayer fullerene has a composition of C60 to C540. Preferably the multilayer fullerene has a configuration with for example C70 arranged on the outside of C60, and C120 arranged further on the outside of C70. Such multilayer fullerene has been described for example in "The Abundant Generation and Application to Lubricants of Onion Structure Fullerene" ("Japan Society for Precision Engineering" vol.67, No.7, 2001) by Takahiro Kakiuchi et. al.

Furthermore, the aforementioned carbon filler may also be made with any of the carbon fillers (a monolayer carbon nanotube, a multilayer carbon nanotube, a vapor grown carbon fiber, a nanografiber, a carbon nanohorn, a cup stack mold carbon nanotube, a monolayer fullerene, or a multi-layer fullerene) doped with boron. The method of doping the carbon filler with boron is disclosed in Japanese Unexamined Patent Application, First Publication No. 2001-200096 or the like. In the method disclosed in Japanese Unexamined Patent Application, First Publication No. 2001-200096, the carbon fiber and boron manufactured by the gaseous-phase method, are mixed by means of a Henschel mixer type mixer, and this mixture is heat-treated at about 2300° C. in a high-frequency induction furnace or the like. Then, the heat-treated mixture is ground by a grinder. Next, the base resin and the ground mixture are blended at a predetermined rate, and melting and kneading carried out by an extruder in order to manufacture a pellet.

Referring to FIG. 1 to FIG. 4, a battery negative terminal 170 is attached to the main plate 102. The battery negative terminal 170 electrically connects the negative electrode of the battery 120 to the negative input section Vss of the IC 118 through the negative pattern of the circuit block 116. The battery clamp 172 is attached to the switch spring 162. The battery clamp 172 and the switch spring 162 electrically connect the positive electrode of the battery 120 and the positive input section Vdd of the IC 118 through the positive pattern of the circuit block 116.

Figure 3:
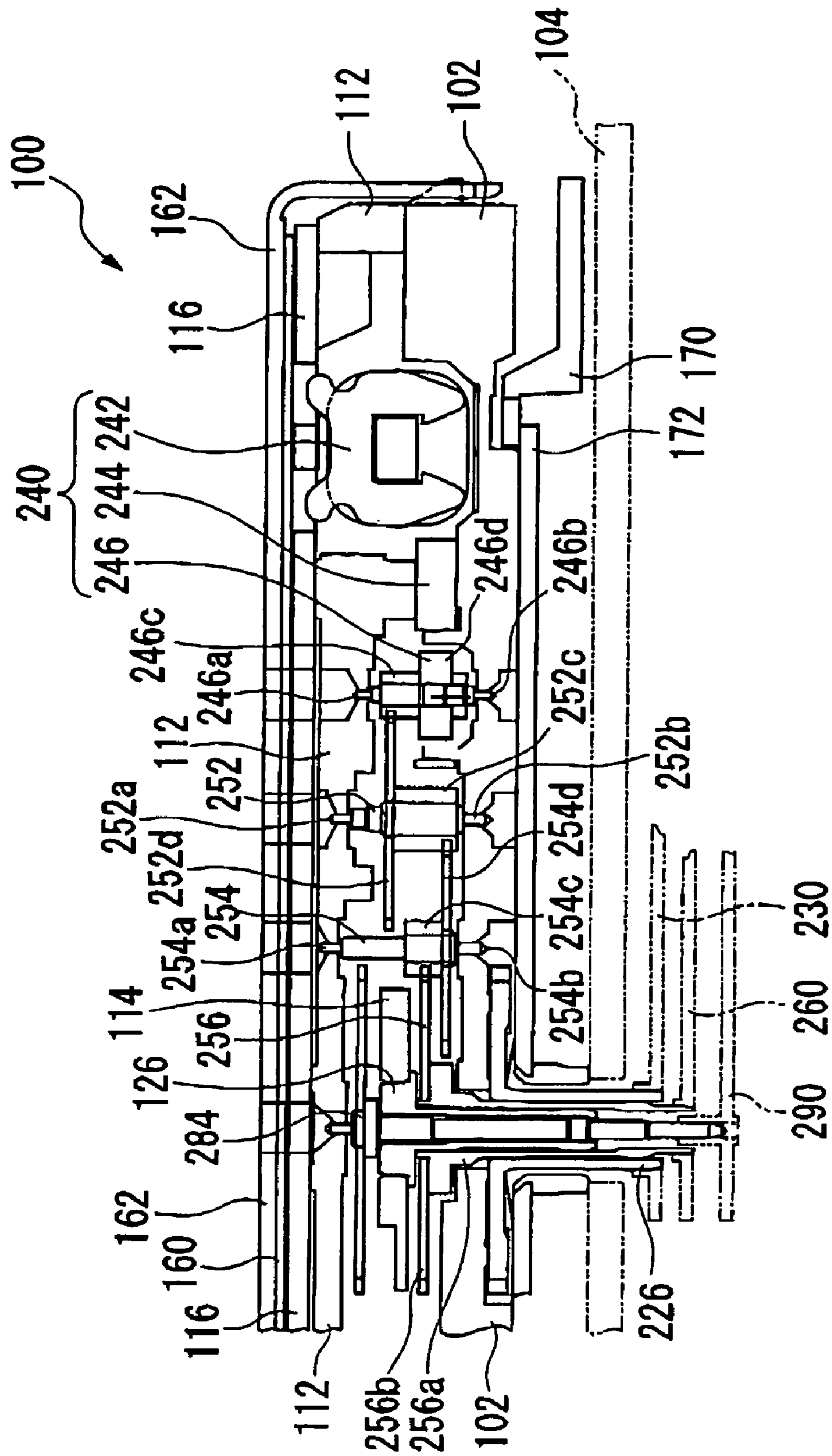
FIG. 3 is a schematic fragmentary sectional view showing a part from a minute motor to a minute hand, in the first embodiment of the present invention.

Referring to FIG. 1 and FIG. 3, a minute motor 240 includes a minute coil block 242, a minute stator 244, and a minute rotor 246. When the minute coil block 242 inputs a minute motor drive signal, the minute stator 244 is magnetized to rotate the minute rotor 246. The minute rotor 246 is configured for example so that it rotates 180 degrees per 20 seconds. The minute rotor 246 includes an upper-shaft section 246*a*, a lower-shaft section 246*b*, a pinion section 246*c*, and a rotor magnet 246*d*. The upper-shaft section 246*a*, the lower-shaft section 246*b*, and the pinion section 246*c* are formed from a so-called engineering plastic such as polyacetal.

The configuration is such that, based on rotation of the minute rotor 246 a first minute transfer wheel 252 rotates, and based on rotation of the first minute transfer wheel 252 a minute wheel 256 rotates through rotation of a second minute transfer wheel 254. The first minute transfer wheel 252 includes an upper-shaft section 252*a*, a lower-shaft section 252*b*, a pinion section 252*c*, and a gear wheel section 252*d*. The pinion section 246*c* is configured so that it meshes with the gear wheel section 252*d*. The first minute transfer wheel 252 is formed from a so-called engineering plastic such as polyacetal. The second minute transfer wheel 254 includes an upper-shaft section 254*a*, a lower-shaft section 254*b*, a pinion section 254*c*, and a gear wheel section 254*d*. The pinion section 254*c* is configured so that it meshes with the gear wheel section 254*d*. The second minute transfer wheel 254 is formed from a so-called engineering plastic such as polyacetal.

The minute wheel 256 includes a cylindrical section 256*a* and a gear wheel section 256*d*. The pinion section 254*c* is configured so that it meshes with the gear wheel section 256*d*. The cylindrical section 256*a* is formed from a metal such as carbon steel. The gear wheel sections 254*d* is formed from a metal such as brass. The minute wheel 256 is configured so that it rotates once per hour. The minute hand 260 is attached to the minute wheel 256. The center of rotation of the minute wheel 256 is the same as the center of rotation of the second wheel 284. The minute hand 260 constitutes a minute display member. Any one of a minute hand, a disk, and other display members in floral or geometric patterns may be used for the minute display member.

The minute display wheel train 250 includes the first minute transfer wheel 252, the second minute transfer wheel 254, and the minute wheel 256. The minute rotor 246, the first minute transfer wheel 252, and the second minute transfer wheel 254 are rotatably supported with respect to the main plate 102 and the wheel train bridge 112. The minute wheel 256 is rotatably supported and contacts with a periphery of a center pipe 126 provided on the second bridge 114. That is, the upper-shaft section 246*a* of the minute rotor 246, the upper-shaft section 252*a* of the first minute transfer wheel 252, and the upper-shaft section 254*a* of the second minute transfer wheel 254 are rotatably supported with respect to the wheel train bridge 112. Moreover, the lower-shaft section 246*b* of the minute rotor 246, the lower-shaft section 252*b* of the first minute transfer wheel 252, and the lower-shaft section 254*b* of the second minute transfer wheel 254 are rotatably supported with respect to the main plate 102.

A bearing of the wheel train bridge 112 which rotatably supports the upper-shaft section 246*a* of the minute rotor 246, a bearing of the wheel train bridge 112 which rotatably supports the upper-shaft section 252*a* of the first minute transfer wheel 252, and a bearing of the wheel train bridge 112 which rotatably supports the upper-shaft section 254*a* of the second minute transfer wheel 254, are lubricated with lubricating oil. A bearing of the lower-shaft section 246*b* of the minute rotor 246, a bearing of the main plate 102 which rotatably supports the lower-shaft section 252*b* of the first minute transfer wheel 252, and a bearing of the main plate 102 which rotatably supports the lower-shaft section 254*b* of the second minute transfer wheel 254, are lubricated with lubricating oil. For this lubricating oil, it is preferable to use precision instrument oil, and it is particularly preferable to use so-called chronometer oil. In order to increase the retention capacity of the lubricating oil, it is preferable to provide the respective bearings of the wheel train bridge 112 and the respective bearings of the main plate 102, with sump sections of cone, cylindrical, or truncated cone shape.

Figure 4:
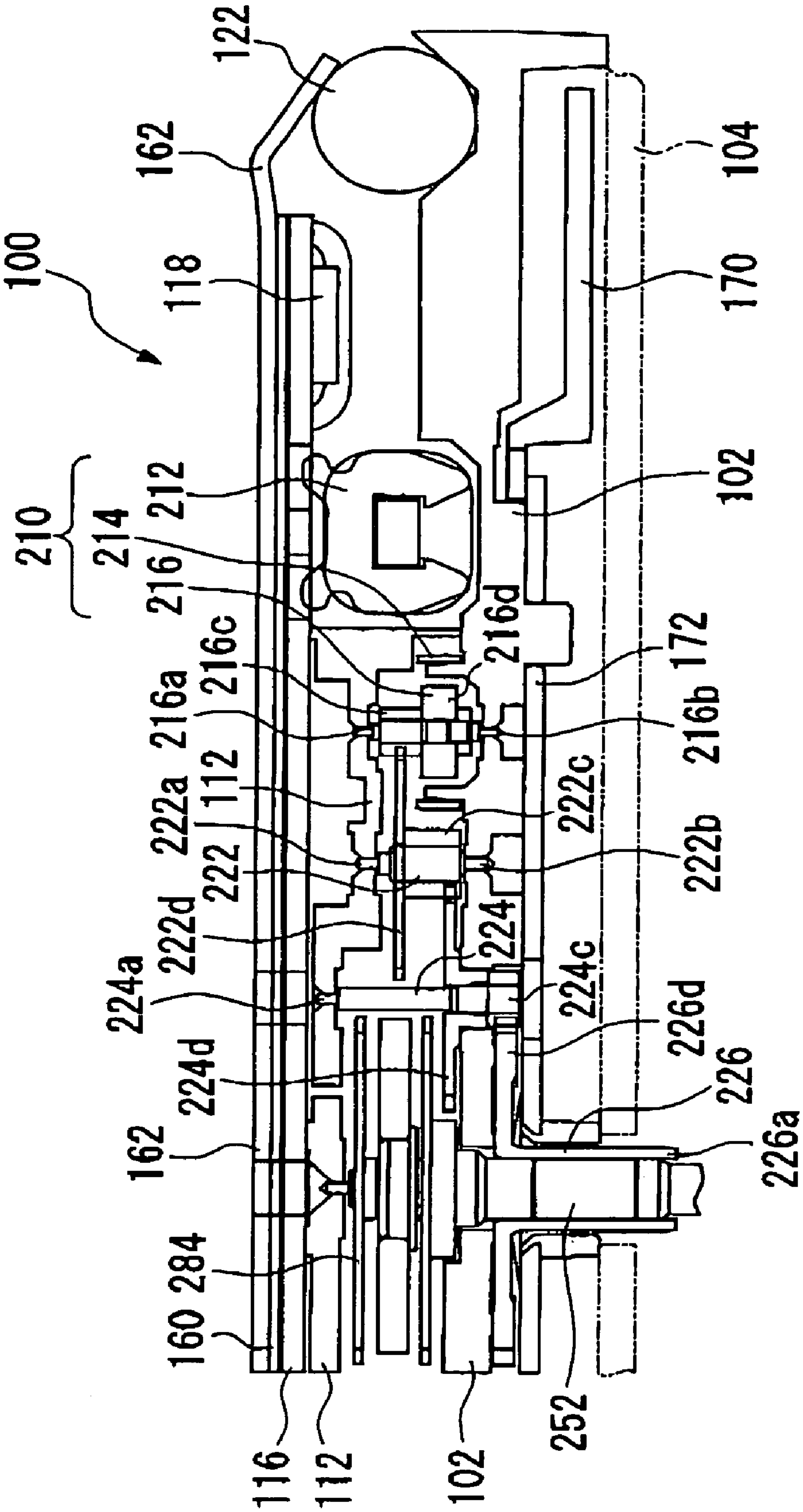
FIG. 4 is a schematic fragmentary sectional view showing a part from an hour motor to an hour hand, in the first embodiment of the present invention.

Referring to FIG. 1 and FIG. 4, an hour motor 210 includes an hour coil block 212, an hour stator 214, and an hour rotor 216. When the hour coil block 212 inputs an hour motor drive signal, the hour stator 214 is magnetized to rotate the hour rotor 216. The hour rotor 216 is configured for example so that it rotates 180 degrees for every 20 minutes. The hour rotor 216 includes an upper-shaft section 216*a*, a lower-shaft section 216*b*, a pinion section 216*c*, and a rotor magnet 216*d*. The upper-shaft section 216*a*, the lower-shaft section 216*b*, and the pinion section 216*c* are formed from a so-called engineering plastic such as polyacetal.

The configuration is such that, based on rotation of the hour rotor 216 a first hour transfer wheel 222 rotates, and based on rotation of the first hour transfer wheel 222 an hour wheel 226 rotates through rotation of a second hour transfer wheel 224. The first hour transfer wheel 222 includes an upper-shaft section 222*a*, a lower-shaft section 222*b*, a pinion section 222*c*, and a gear wheel section 222*d*. The pinion section 216*c* is configured so that it meshes with the gear wheel section 222*d*. The first hour transfer wheel 222 is formed from a so-called engineering plastic such as polyacetal. The second hour transfer wheel 224 includes an upper-shaft section 224*a*, a lower-shaft section 224*b*, a pinion section 224*c*, and a gear wheel section 224*c*. The pinion section 222*c* is configured so that it meshes with the gear wheel section 224*d*. The second hour transfer wheel 224 is formed from a so-called engineering plastic such as polyacetal.

The hour wheel 226 includes a cylindrical section 226*a* and a gear wheel section 226*d*. The pinion section 224*c* is configured so that it meshes with the gear wheel section 226*d*. The hour wheel 226 is formed from a metal such as brass. The hour wheel 226 is configured so that it rotates once per 12 hours. The hour hand 230 is attached to the hour wheel 226. The center of rotation of the hour wheel 226 is the same as the center of rotation of the minute wheel 256. Therefore, the center of rotation of the hour wheel 226, the center of rotation of the minute wheel 256, and the center of rotation of the second wheel 284 are the same. The hour hand 230 constitutes an hour display member. Any one of an hour hand, a disk, and other display members in floral or geometric patterns may be used for the hour display member.

The hour display wheel train 220 includes the first hour transfer wheel 222, the second hour transfer wheel 224, and the hour wheel 226. The hour rotor 216, the first hour transfer wheel 222, and the second hour transfer wheel 224 are rotatably supported with respect to the main plate 102 and the wheel train bridge 112. The hour wheel 226 is rotatably supported and contacts with a periphery of the minute wheel 256. That is, the upper-shaft section 216*a* of the hour rotor 216, the upper-shaft section 222*a* of the first hour transfer wheel 222, and the upper-shaft section 224*a* of the second hour transfer wheel 224 are rotatably supported with respect to the wheel train bridge 112. Moreover, the lower-shaft section 216*b* of the hour rotor 216, the lower-shaft section 222*b* of the first hour transfer wheel 222, and the lower-shaft section 224*b* of the second hour transfer wheel 224 are rotatably supported with respect to the main plate 102.

A bearing of the wheel train bridge 112 which rotatably supports the upper-shaft section 216*a* of the hour rotor 216, a bearing of the wheel train bridge 112 which rotatably supports the upper-shaft section 222*a* of the fist hour transfer wheel 222, and a bearing of the wheel train bridge 112 which rotatably supports the upper-shaft section 224*a* of the second hour transfer wheel 224, are lubricated with lubricating oil. A bearing of the lower-shaft section 216*b* of the hour rotor 216, a bearing of the main plate 102 which rotatably supports the lower-shaft section 222*b* of the first hour transfer wheel 222, and a bearing of the main plate 102 which rotatably supports the lower-shaft section 224*b* of the second hour transfer wheel 224, are lubricated with lubricating oil. For this lubricating oil, it is preferable to use precision instrument oil, and it is particularly preferable to use a so-called chronometer oil. In order to increase the retention capacity of the lubricating oil, it is preferable to provide the respective bearings of the wheel train bridge 112 and the respective bearings of the main plate 102, with sump sections of cone, cylindrical, or truncated cone shape.

The configuration is such that a day wheel (not shown) rotates due to the rotation of the hour wheel 226. The day wheel is provided so that it rotates once per day due to rotation of the hour wheel 226. The configuration is such that a day pawl (not shown) provided on the day wheel forwards the date dial 170 by one tooth per day.

Next is a description of a manufacturing method for the movement 100 of the analog electronic timepiece, in the first embodiment of the analog electronic timepiece of the present invention. The main plate 102 and the wheel train bridge 112 are formed by injection molding using a filled resin having a base resin of thermoplastic resin and carbon fiber mixed with this base resin. The minute rotor 246, the first minute transfer wheel 252, the second minute transfer wheel 254, the hour rotor 216, the first hour transfer wheel 222, the second hour transfer wheel 224, the second rotor 276, and the second transfer wheel 282 are formed by injection molding using polyacetal. Other components are manufactured by conventional manufacturing methods.

Figure 8:
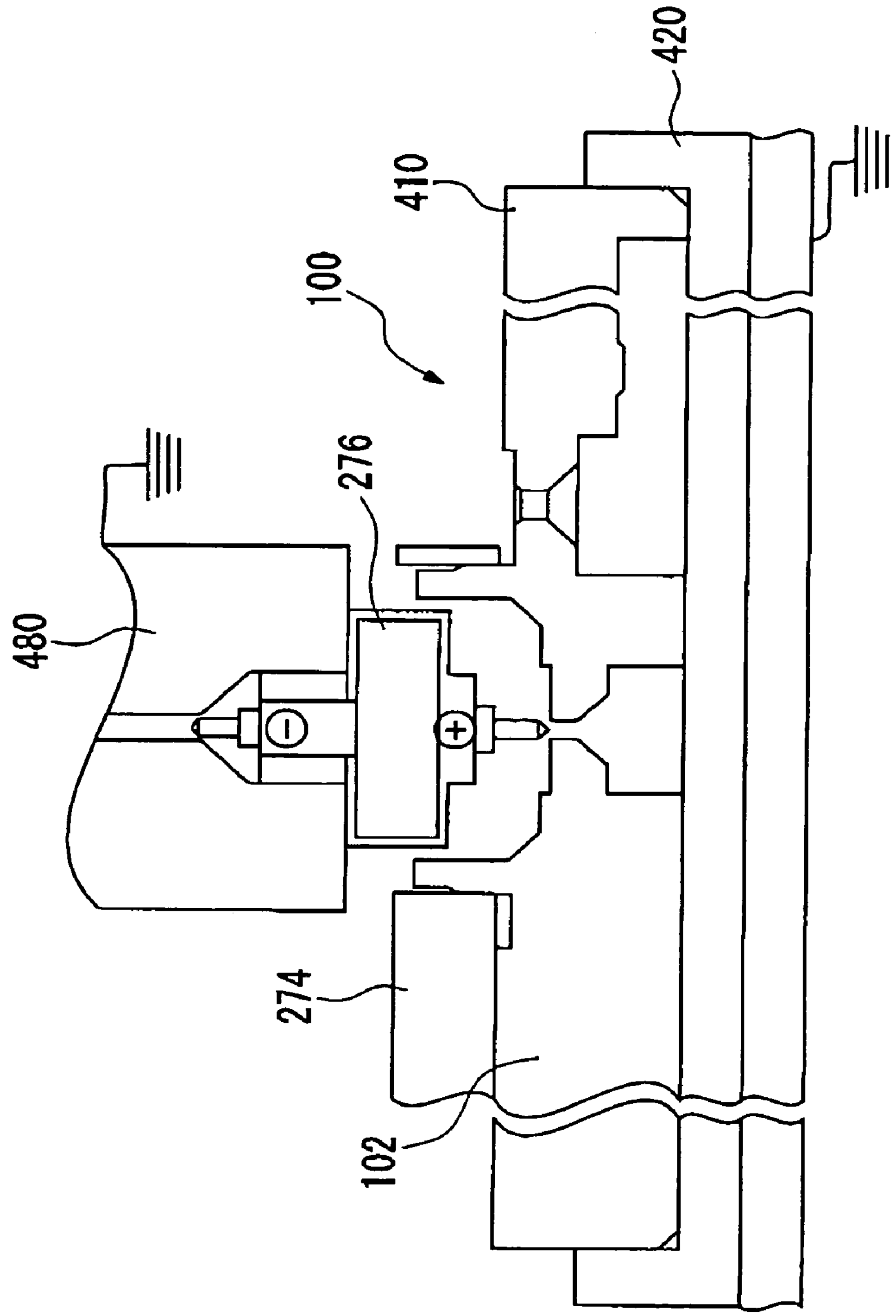
FIG. 8 is a schematic fragmentary sectional view showing a process to construct a second rotor, in the first embodiment of the present invention.
Figure 9:
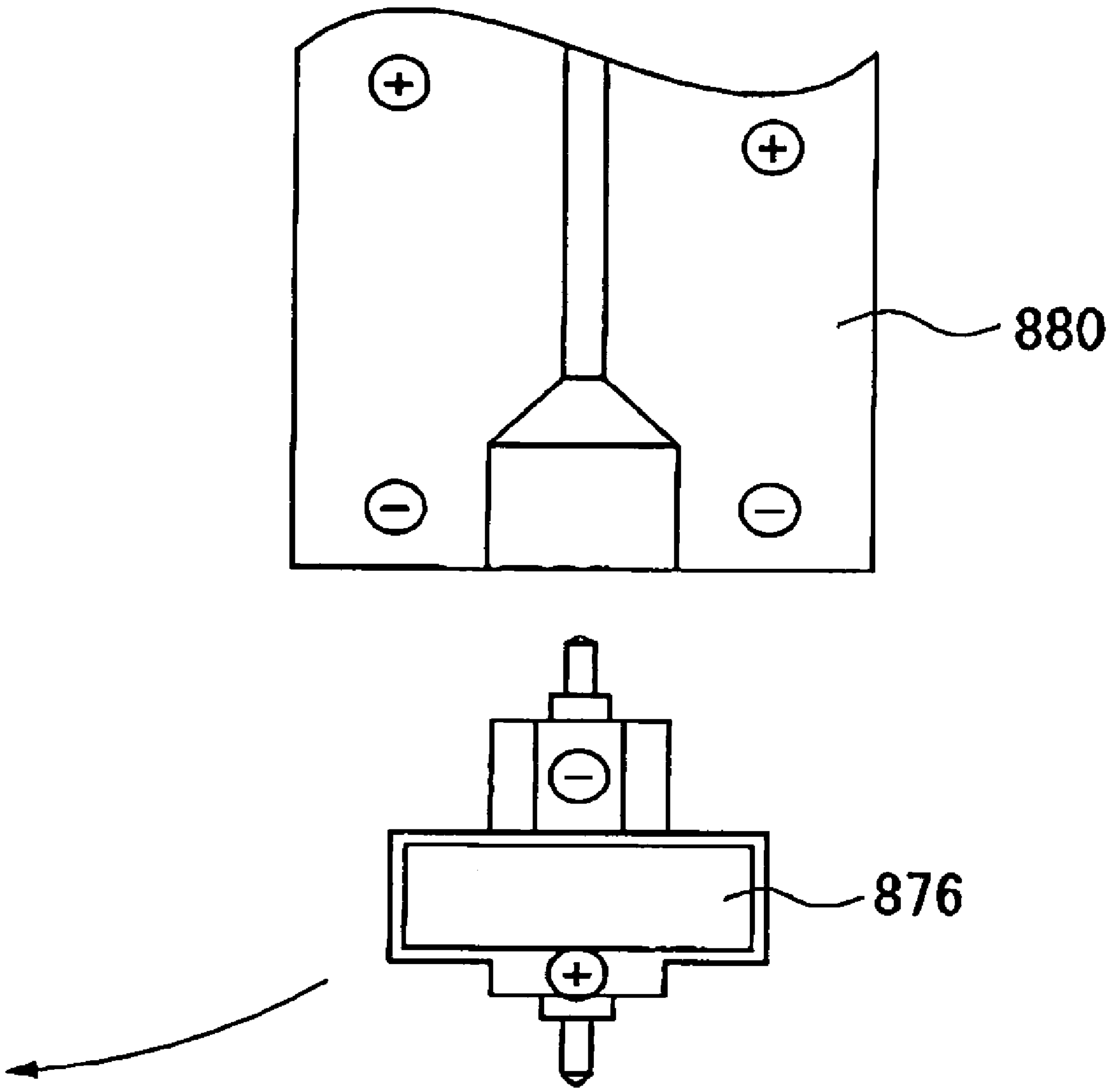
FIG. 9 is a schematic fragmentary sectional view showing a process to chuck a rotor, in a conventional timepiece.
Figure 10:
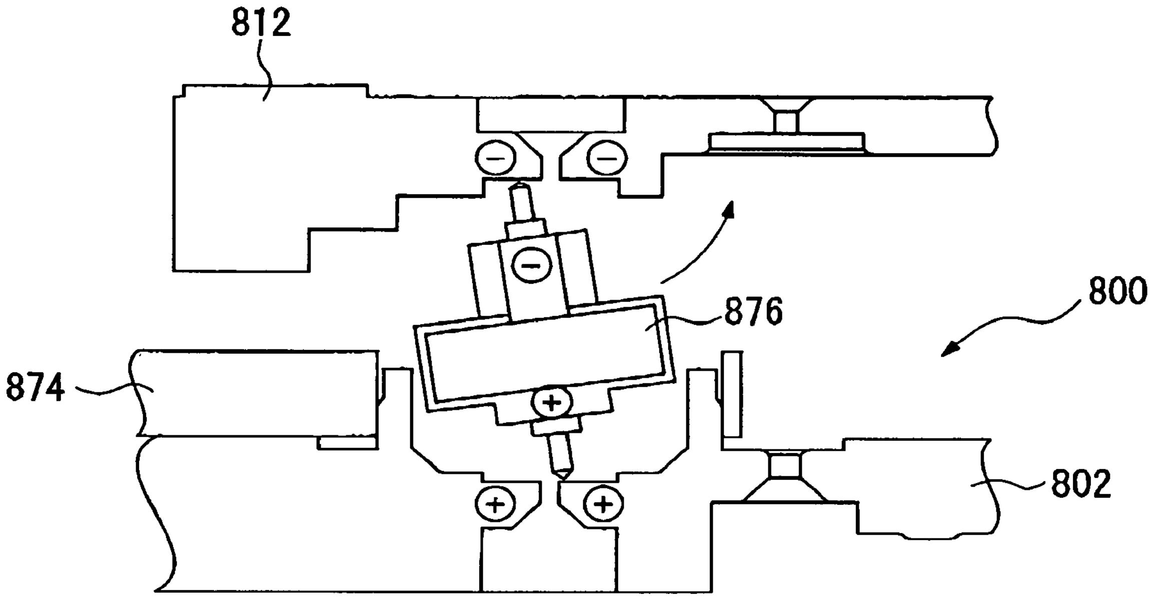
FIG. 10 is a schematic fragmentary sectional view showing a process to construct a rotor, in a conventional timepiece.
Figure 11:
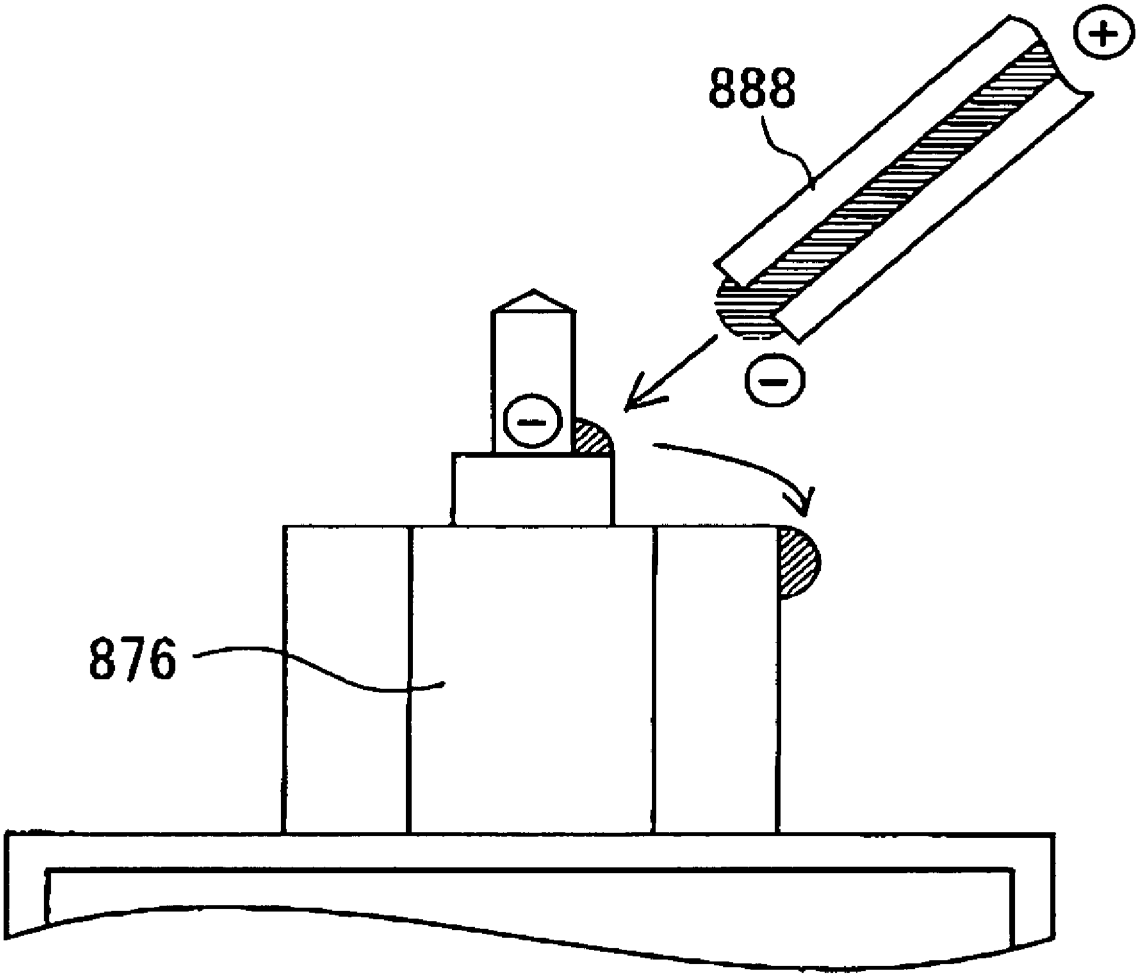
FIG. 11 is a schematic fragmentary sectional view showing a process to lubricate to a shaft section of a rotor, in a conventional timepiece.

Referring to FIG. 8, a pallet 410 for holding and transporting the main plate 102 is formed from a conductive material. The pallet 410 may be formed from a metal such as brass, or may be formed by injection molding using the aforementioned filled resin. The pallet 410 is arranged on a transport member 420 formed from a metal such as brass. The transport member is earthed. A metal chuck 480 is earthed. The metal chuck 880 holds the second rotor 276, to insert the second rotor 276 into the main plate 102. As shown in the drawing, even if the second rotor 276 is charged, since the chuck 480 is earthed, the second rotor 276 will not try to come out from the chuck 480. Moreover, as shown in the drawing, even if the second rotor 276 is charged, the transport member 420 is earthed. Therefore the pallet 410 and the main plate 102 are also earthed, and hence the second rotor 276 will not try to come out from the main plate 102.

That is, in the present invention, since the filled resin has conductivity, the main plate 102 will not become charged. Therefore, without spraying antistatic agent on the plastic parts such as the minute rotor 246, the first minute transfer wheel 252, the second minute transfer wheel 254, the hour rotor 216, the first hour transfer wheel 222, the second hour transfer wheel 224, the second rotor 276, and the second transfer wheel 282, the plastic parts can be held by the chuck, and the plastic parts can be reliably fitted into the main plate 102. Similarly, the minute rotor 246, the first minute transfer wheel 252, the second minute transfer wheel 254, the hour rotor 216, the first hour transfer wheel 222, the second hour transfer wheel 224, and the second transfer wheel 282, can be held by the chuck, and the plastic parts can be reliably fitted into the main plate 102.

Furthermore, the metal chuck holds the wheel train bridge 112 to insert the wheel train bridge 112 into the main plate 102. As shown in the drawing, even if the second rotor 276 is charged, since the chuck is earthed, the wheel train bridge 112 is also earthed, so that the second rotor 276 will not try to come out from the wheel train bridge 112. Such manufacturing method of the timepiece movement can be applied not only to the main plate 102 and the wheel train bridge 112, but also to bearing members such as the second and third bridge, seat members such as the third lower seat, plate members such as the calendar back plate, presser members such as the back holder and date dial guard, and frame members such as the winder frame and the battery frame.

As a modified example, all the rotor pinion of the second rotor 276 and the second transfer wheel 282 may be formed from a filled resin having a base resin of thermoplastic resin and carbon fiber mixed with this base resin. If all the rotor pinion of the second rotor 276 and the second transfer wheel 282 are formed from the filled resin, since the filled resin has conductivity, the second rotor 276 and the second transfer wheel 282 will not become charged. Therefore, these plastic parts can be held by the chuck, and these plastic parts can be reliably fitted into the main plate 102.

Moreover, as a modified example, all the rotor pinion of the minute rotor 246, the first minute transfer wheel 252 and the second minute transfer wheel 254 may be formed from a filled resin having a base resin of thermoplastic resin and carbon fiber mixed with this base resin. If all the rotor pinion of the minute rotor 246, the first minute transfer wheel 252 and the second minute transfer wheel 254 are formed from the filled resin, since the filled resin has conductivity, the minute rotor 246, the first minute transfer wheel 252 and the second minute transfer wheel 254 will not become charged. Therefore, these plastic parts can be held by the chuck, and these plastic parts can be reliably fitted into the main plate 102.

Furthermore, as a modified example, all the rotor pinion of the hour rotor 216, the first hour transfer wheel 222 and the second hour transfer wheel 224 may be formed from a filled resin having a base resin of thermoplastic resin and carbon fiber mixed with this base resin. If all the rotor pinion of the minute rotor 246, the first minute transfer wheel 252 and the second minute transfer wheel 254 are formed from the filled resin, since the filled resin has conductivity, the hour rotor 216, the first hour transfer wheel 222 and the second hour transfer wheel 224 will not become charged. Therefore, these plastic parts can be held by the chuck and these plastic parts can be reliably fitted into the main plate 102.

In the respective modified examples, the main plate 102 and the wheel train bridge 112 are preferably formed from the filled resin. However the main plate 102 and/or the wheel train bridge 112 may be formed from a metal, or a plastic other than the filled resin. In this configuration, the plastic parts to be fitted into the main plate 102, will not become charged. Therefore, these plastic parts can be held by the chuck and these plastic parts can be reliably fitted into the main plate 102.

(Second Embodiment)

Figure 5:
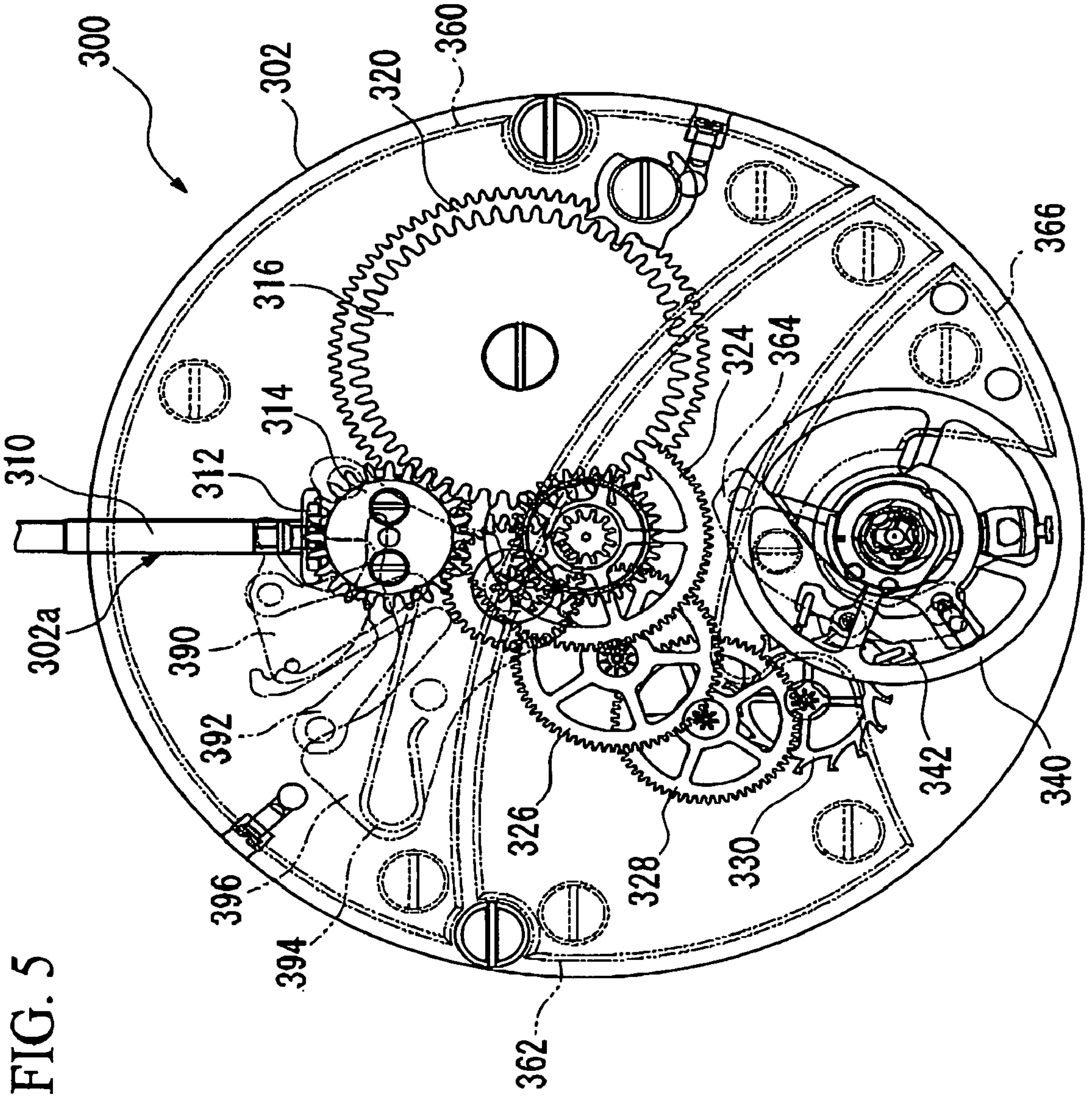
FIG. 5 is a plan view showing a schematic configuration of a movement seen from the observe side, in a second embodiment of the present invention (some components are omitted in FIG. 5, and the imaginary lines denote bearing members).
Figure 6:
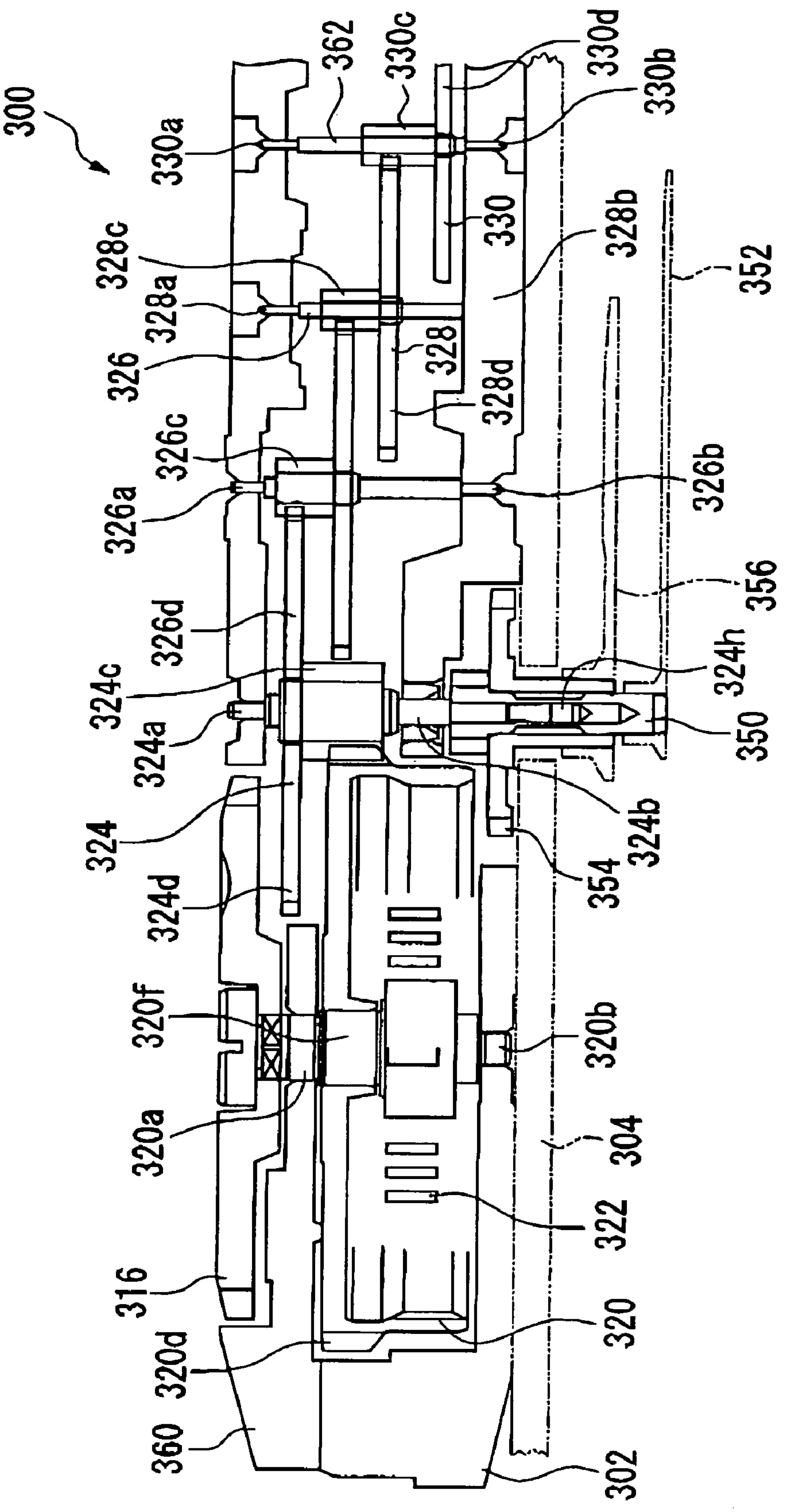
FIG. 6 is a schematic fragmentary sectional view showing a part from a barrel drum to a pallet fork, in the second embodiment of the present invention.
Figure 7:
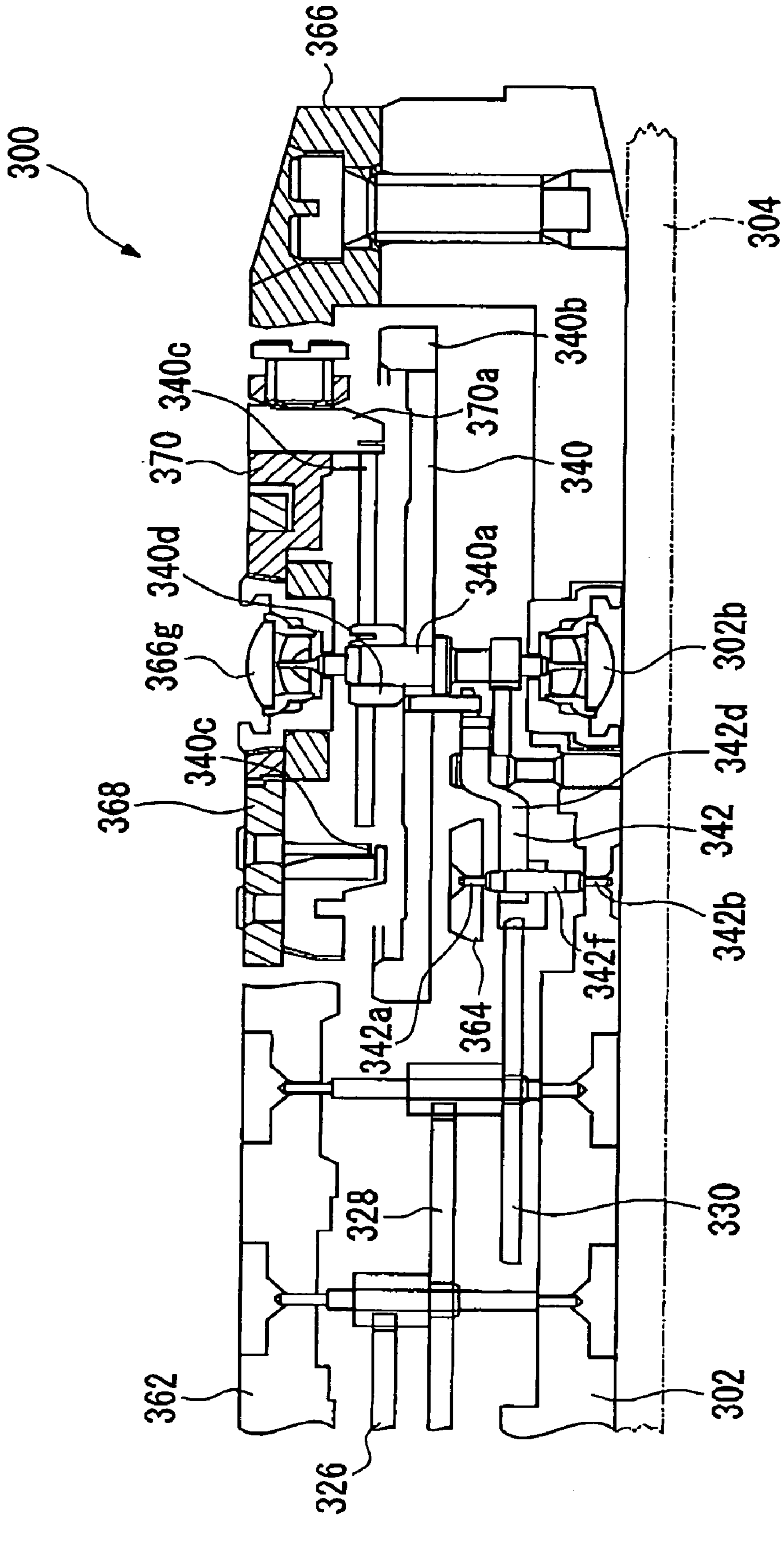
FIG. 7 is a schematic fragmentary sectional view showing a part from an escape wheel-and-pinion to a balance complete, in the second embodiment of the present invention.

Next is the description of a second embodiment of the present invention. The second embodiment of the present invention is a mechanical timepiece including a spring and a wheel train. Referring to FIG. 5 to FIG. 7, in the mechanical timepiece, a movement (machine body) 300 of the mechanical timepiece has a main plate 302 constituting the substrate of the movement. A hand setting stem 310 is rotatably built in to a hand setting stem guiding hole 302*a* of the main plate 302. A dial 304 (denoted by imaginary lines in FIG. 26) is installed in the movement 300. Generally, of the two sides of the main plate, the side with the dial is called the “back side” of the movement, and the opposite side to the side with the dial is called the “observe side” of the movement. The wheel train built in to the “observe side” of the movement is called a “front wheel train”, and the wheel train built in to the “back side” of the movement is called a “back wheel train”.

The position in the axial direction of the hand setting stem 310 is determined by a switching device including a setting lever 390, a yoke 392, a setting lever spring 394, and a back holder 396. A winding pinion 312 is rotatably provided on a guiding shaft of the hand setting stem 310. If the hand setting stem 310 is rotated in a condition with the hand setting stem 310 in a first winding position (0th step) nearest to the inside of the movement along the axial direction of rotation, the winding pinion 312 will rotate through rotation of a drum wheel.

A round-holed wheel 314 rotates by rotation of the winding pinion 312. A square-holed wheel 316 rotates by rotation of the round-holed wheel 314. By rotation of the square-holed wheel 316, a mainspring 322 accommodated in a barrel complete 320 is wound up. A second wheel-and-pinion 324 rotates by rotation of the barrel complete 320. An escape wheel-and-pinion 330 rotates through rotation of a fourth wheel-and-pinion 328, a Third wheel-and-pinion 326, and the second wheel-and-pinion 324. The barrel complete 320, the second wheel-and-pinion 324, the third wheel-and-pinion 326 and the fourth wheel-and-pinion 328 constitute the front wheel train.

An escapement and a speed governor for controlling rotation of the front wheel train, contain a balance complete 340, an escape wheel-and-pinion 330, and a pallet fork 342. The balance complete 340 includes an balance staff 340*a,* an balance wheel 340*b,* and a hair spring 340*c.* Based on rotation of the second wheel-and-pinion 324, a cannon pinion 350 rotates at the same time. A minute hand 352 attached to the cannon pinion 350 displays “minutes.” A slip mechanism for the second wheel-and-pinion 324 is provided in the cannon pinion 350. Based on rotation of the cannon pinion 350, a hour wheel 354 rotates through rotation of the day back wheel. An hour hand 356 attached to the hour wheel 354 displays “time”.

The hair spring 340*c* is a thin plate spring in a spiral (helix) shape with two or more turns The inner end of the hair spring 340*c* is fixed to a collet 340*d* fixed to the balance staff 340*a,* and the outer end of the hair spring 340*c* is fixed by a thread fastening via a stud support 370*a* fitted to a stud 370 fixed to a balance cock 366. A slow-fast needle 368 is rotatably attached to the balance cock 366. A regulator key 1340 and a regulator pin 1342 are attached to the slow-fast needle 368. The part near the outer end of the hair spring 340*c* is located between the regulator key 1340 and the regulator pin 1342. The balance complete 340 is rotatably supported with respect to the main plate 302 and the balance cock 366.

The barrel complete 320 is provided with a barrel drum gear wheel 320*d*, a barrel arbor 320*f,* and a mainspring 322. The barrel arbor 320*f* includes an upper-shaft section 320*a* and a lower-shaft section 320*b*. The barrel arbor 320*f* is formed from a metal such as carbon steel. The barrel drum gear wheel 320*d* is formed from a metal such as brass. The second wheel-and-pinion 324 includes an upper-shaft 324*a,* a lower-shaft section 324*b,* a pinion section 324*c,* a gear wheel section 324*d*, and a bead section 324*h*. The pinion section 324*c* is configured so that it meshes with the barrel drum gear wheel 320*d.* The upper-shaft 324*a,* the lower-shaft section 324*b,* and the bead section 324*b* are formed from a metal such as carbon steel. The gear wheel section 324*d* is formed from a metal such as brass.

The third wheel-and-pinion 326 includes an upper-shaft section 326*a,* a lower-shaft section 326*b,* a pinion section 326*c,* and a gear wheel section 326*d.* The pinion section 326*c* is configured so that it meshes with the gear wheel section 324*d.* The third wheel-and-pinion 326 is formed from a so-called engineering plastic, such as polyacetal. The fourth wheel-and-pinion 328 contains an upper-shaft section 328*a,* a lower-shaft section 328*b,* a pinion section 328*c,* and a gear wheel section 328*d.* The pinion section 328*c* is configured so that it meshes with the gear wheel section 326*d.* The fourth wheel-and-pinion 328 is formed from a so-called engineering plastic, such as polyacetal.

The escape wheel-and-pinion 330 includes an upper-shaft section 330*a,* a lower-shaft section 330*b,* a pinion section 330*c,* and a gear wheel section 330*d.* The pinion section 330*c* is configured so that it meshes with the gear wheel section 328*d.* The upper-shaft section 330*a* and the lower-shaft section 330*b* are formed from a metal such as carbon steel. The gear wheel section 330*d* is formed from a metal such as iron. The pallet fork 342 is provided with an anchor-escapement body 342*d* and an anchor-escapement center 342*f.* The anchor-escapement center 342*f* includes an upper-shaft section 342*a* and a lower-shaft section 342*b*. The anchor-escapement body 342*d* is formed from a metal such as nickel. The anchor-escapement center 342*f* is formed from a metal such as carbon steel.

The barrel complete 320 is rotatably supported with respect to the main plate 302 and the barrel drum bridge 360. That is, the upper-shaft 320*a* of the barrel arbor 320*f* is rotatably supported with respect to the barrel drum bridge 360. The lower-shaft section 320*b* of barrel arbor 320*f* is rotatably supported with respect to the main plate 302. The second wheel-and-pinion 324, the third wheel-and-pinion 326, the fourth wheel-and-pinion 328 and the escape wheel-and-pinion 330 are rotatably supported with respect to the main plate 302 and the wheel train bridge 362. That is, the upper-shaft section 324*a* of the second wheel-and-pinion 324, the upper-shaft section 326*a* of the third wheel-and-pinion 326, the upper-shaft section 328*a* of the fourth wheel-and-pinion 328 and the upper-shaft section 330*a* of the escape wheel-and-pinion 330 are rotatably supported with respect to the wheel train bridge 362. Moreover, the lower-shaft section 324*b* of the second wheel-and-pinion 324, the lower-shaft section 326*b* of the third wheel-and-pinion 326, the lower-shaft section 328*b* of the fourth wheel-and-pinion 328, and the lower-shaft section 330*b* of an escape wheel-and-pinion 330 are rotatably supported with respect to the main plate 302.

A bearing of the barrel drum bridge 360 which rotatably supports the upper-shaft section 320*a* of the barrel arbor 320*f*, a bearing of the wheel train bridge 362 which rotatably supports the upper-shaft section 324*a* of the second wheel-and-pinion 324, a bearing of the wheel train bridge 362 which rotatably supports the upper-shaft section 326*a* of the third wheel-and-pinion 326, a bearing of the wheel train bridge 362 which rotatably supports the upper-shaft section 328*a* of the fourth wheel-and-pinion 328, a bearing of the wheel train bridge 362 which rotatably supports the upper-shaft section 330*a* of the escape wheel-and-pinion 330, and a bearing of the anchor escapement bridge 364 which rotatably supports the upper-shaft section 342*a* of the pallet fork 342, are lubricated with lubricating oil. A bearing of the main plate 102 which rotatably supports the lower-shaft section 276*b* of the second rotor 276, a bearing of the main plate 302 which rotatably supports the lower-shaft section 320*b* of the barrel arbor 320*f*, a bearing of the main plate 302 which rotatably supports the lower-shaft section 324*b* of the second wheel-and-pinion 324, a bearing of the main plate 302 which rotatably supports the lower-shaft section 326*b* of the third wheel-and-pinion 326, a bearing of the main plate 302 which rotatably supports the lower-shaft section 328*b* of the fourth wheel-and-pinion 328, a bearing of the main plate 302 which rotatably supports the lower-shaft section 320*b* of the escape wheel-and-pinion 330, and a bearing of the main plate 302 which rotatably supports the lower-shaft section 342*b* of the pallet fork 342, are lubricated with lubricating oil. For this lubricating oil, it is preferable to use precision instrument oil, and it is particularly preferable to use so-called chronometer oil.

In order to increase the retention capacity of the lubricating oil, it is preferable to provide the respective bearings of the main plate 302, the respective bearings of the barrel drum bridge 360, and the respective bearings of the wheel train bridge 360, with sump sections of cone, cylindrical, or truncated cone shape. If the sump section is provided, the lubricating oil can be effectively prevented from spreading, by the surface tension of the oil. The main plate 302, the barrel drum bridge 360, the wheel train bridge 362, and the anchor escapement bridge 364 are formed from a filled resin having a base resin of thermoplastic resin and carbon fiber mixed with this base resin. If the main plate 302, the barrel drum bridge 360, the wheel train bridge 362, and the anchor escapement bridge 364 are formed from the filled resin, the lubricating oil can be effectively held due to the filler. Therefore the likelihood of the lubricating oil being scattered without being retained by the bearings can be reduced.

The filled resin used for the main plate 302, the barrel drum bridge 360, the wheel train bridge 362, and the anchor escapement bridge 364 in the second embodiment of the present invention, is the same as the filled resin used for the main plate 102 and the wheel train bridge 162 in the first embodiment of the present invention. Therefore, the above-mentioned description for the filled resin, the base resin, and the carbon filler in the first embodiment of the present invention also applies here.

Next is a description of a manufacturing method for the movement 300 of the mechanical timepiece, in the second embodiment of the present invention. The main plate 302, the barrel drum bridge 360, the wheel train bridge 362, and the anchor escapement bridge 364, are formed by injection molding using a filled resin having a base resin of thermoplastic resin and carbon fiber mixed with this base resin. The third wheel-and-pinion 326 and the fourth wheel-and-pinion 328 are formed by injection molding using polyacetal. Other components are manufactured by conventional manufacturing methods.

Similarly to the configuration described in FIG. 8, a pallet for holding and transporting the main plate 302 is formed from a conductive material. The pallet may be formed from a metal such as brass, or may be formed by injection molding using the aforementioned filled resin. The pallet is arranged on a transport member formed from a metal such as brass. The transport member is earthed. A metal chuck is earthed. The metal chuck holds the third wheel-and-pinion 326 to insert the third wheel-and-pinion 326 into the main plate 302. Even if Third wheel-and-pinion 326 is charged, since the chuck is earthed, the third wheel-and-pinion 326 will not try to come out from the chuck. Moreover, even if the third wheel-and-pinion 326 is charged, the transport member is earthed. Therefore the pallet and the main plate 302 are also earthed, and hence the third wheel-and-pinion 326 will not try to come out from the main plate 302.

That is, in the present invention, since the filled resin has conductivity, the main plate 302 will not become charged. Therefore, without spraying antistatic agent on the plastic parts such as the third wheel-and-pinion 326 and the fourth wheel-and-pinion 328, the plastic parts can be held by the chuck, and the plastic parts can be reliably fitted into the main plate 302. Furthermore, the metal chuck holds the wheel train bridge 362 to insert the wheel train bridge 362 into the main plate 302. Even if the third wheel-and-pinion 326 and fourth wheel-and-pinion 328 are charged, since the chuck is earthed, the wheel train bridge 362 is also earthed so that the third wheel-and-pinion 326 and fourth wheel-and-pinion 328 will not try to come out from the wheel train bridge 362. By this configuration of the present invention, without spraying antistatic agent on the plastic parts such as the third wheel-and-pinion 326 and the fourth wheel-and-pinion 328, the plastic parts can be held by the chuck, and the plastic parts can be reliably fitted into the main plate 302.

As a modified example, the third wheel-and-pinion 326 and fourth wheel-and-pinion 328 may be formed from a filled resin having a base resin of thermoplastic resin and carbon fiber mixed with this base resin. If the third wheel-and-pinion 326 and fourth wheel-and-pinion 328 are formed from the filled resin, since the filled resin has conductivity, the third wheel-and-pinion 326 and the fourth wheel-and-pinion 328 will not become charged. Therefore, these plastic parts can be held by the chuck, and these plastic parts can be reliably fitted into the main plate 302. In the modified example, the main plate 302 and the wheel train bridge 362 may be formed from the filled resin. However the main plate 102 and/or the wheel train bridge 362 may be formed from a metal, or a plastic other than the filled resin. In this configuration, the plastic parts to be fitted into the main plate 302, will not become charged. Therefore, these plastic parts can be held by the chuck. and these plastic parts can be reliably fitted into the main plate 302.

In the above embodiments of the present invention, the present invention was described for an embodiment of an analog electronic timepiece including a plurality of motors and a plurality of wheel trains, and an embodiment of a mechanical timepiece including one mainspring and one wheel train. However, the present invention may be applied to an analog electronic timepiece including one motor and one wheel train, may be applied to an analog electronic timepiece including one motor and a plurality of wheel trains, may be applied to a mechanical timepiece including a plurality of mainsprings and a plurality of wheel trains, and may be applied to a timepiece including motors and wheel trains, and including mainsprings and wheel trains.

In the above embodiments of the present invention, the present invention was described for an analog electronic timepiece and a mechanical timepiece. However, the present invention may be applied to an analog electronic timepiece including one motor and one wheel train, may be applied to an analog electronic timepiece including one motor and a plurality of wheel trains, may be applied to a mechanical timepiece including a plurality of mainsprings and a plurality of wheel trains, and may be applied to a timepiece including motors and wheel trains, and including mainsprings and wheel trains. In the above embodiments of the present invention, the present invention was described for an analog electronic timepiece and a mechanical timepiece. However, the present invention may be applied to a wheel train apparatus including one or more gear wheels.

In the present timepiece, when the main plate is formed from the filled resin and the other members such as the bearing members, seat members, plate members, presser members and fame members are formed from the filled resin, it is preferable to electrically connect the other members formed from the filled resin with the main plate. In this electrical connection method, the other members and the main plate may be directly contacted, or the other members and the main plate may be electrically connected through metal pins, screws, levers, springs, bearing members, seat member, plate members, or the like. In such configurations, the plastic parts may be held by a metal chuck so that these plastic parts can be fitted into the other members. Even if the plastic parts are charged, since the chuck is earthed the plastic parts will not try to come out from the chuck. Moreover, even if the plastic parts are charged, since the transport member is earthed, and the pallet, the main plate and the other members are also earthed, the plastic parts will not try to come out from the main plate. That is, in the present invention, since the filled resin has conductivity, the main plate and the other members will not become charged. Therefore, without spraying antistatic agent on the plastic parts, the plastic parts can be held by the chuck, and the plastic parts can be reliably fitted into the other members electrically connected to the main plate.

In the above embodiments of the present invention, generally the base resin is polystyrene, polyethylene terephthalate, polycarbonate, polyacetal (polyoxymethylene), polyamide, modified polyphenylene ether, polybutylene terephthalate, polyphenylene sulfide, polyether ether ketone, or polyether imide. However, other plastics, for example, a thermoplastic resin such as polysulfone, polyether sulphone, polyethylene, nylon 6, nylon 66, nylon 12, polypropylene, ABS plastic, or AS resin, can also be used as the base resin. Moreover, two or more kinds of the abovementioned thermoplastic resins may be mixed to use as the base resin. Furthermore, an additive (antioxidant, lubricant, plasticizer, stabilizer, bulking agent, solvent, or the like) may be blended with the base resin used in this invention.

Next is a description of an example of experimental data showing that the carbon filled resin has conductivity in the above embodiment, with reference to TABLE 1 and TABLE 2.

TABLE. 1 shows the basic characteristic (specific resistance) of polyamide resin 12 (PA12), polyacetal resin (POM), and polycarbonate resin (PC) with a carbon filler of 10% or 20% by weight added. That is, in TABLE. 1, VGCF (trademark) "Vapor Grown Carbo Fiber" is a resin with carbon filler of 10% or 20% by weight added. From the experimental data, it can be seen whether or not the carbon-filler-including resin is easily charged. The characteristics of non-composite materials with carbon filler not added (single resin, that is PA 12, POM, PC itself) are shown as 'BLANK' for comparison.

The respective resins mentioned above were injection mould under the molding conditions shown in TABLE 2. That is, for a composite material of PA12 with carbon filler of 20% by weight added, the temperatures was 220° C. at the nozzle, 230° C. at the front section (metering section), 220° C. at the middle section (compressing section), 210° C. at the back section (supplying section), and 70° C. at the mold. For the non-composite material of PA12, the respective temperatures were 190° C., 200° C., 180° C., 170° C., and 70° C. For the composite material of POM with carbon filler of 20% by weight added, the above respective temperatures were 200° C., 210° C., 190° C., 170° C., and 60° C., and for the non-composite material of POM, the respective temperatures are 180° C., 185° C., 175° C., 165° C., and 60° C. For the composite material of PC with carbon filler of 20% by weight added, the above temperatures were 290° C., 310° C., 290° C., 270° C., and 80° C., and for the non-composite material of PC, the respective temperatures were 280° C., 290° C., 270° C., 260° C., and 80° C. For the composite material of PA12 with carbon filler of 10% by weight added, the conditions were the same as for with the 20% by weight.

In TABLE. 1, the volume resistance (Ω·cm) and the surface resistance (Ω/□) were measured using a resistivity meter of MCP-T600 (LORESTA GP, made by DIA INSTRUMENTS Inc.), or MCP-HT450 (HIRESTA UP, made by DIA INSTRUMENTS Inc.). For the volume resistance, a resin piece of 100 mm×80 mm×2 mm was measured.

As shown in TABLE. 1, in relation to the surface resistance and the volume resistance, compared to the resin with carbon filler of 10% by weight added, that with 20% by weight added showed a considerably improvement. The surface resistance and the volume resistance are the criteria for determining ease of charging. The smaller the surface resistance and the volume resistance, the more difficult for the static electricity to charge up. Here, if the surface resistance (Ω/□) and the volume resistance (Ω·cm) are in a range of $10^{13}$ to $10^{3}$, this functions as an antistatic material.

Here, as mentioned above, by using the resin with carbon filler of 20% by weight added, for the aforementioned substrate of the timepiece (or the wheel train apparatus), there is no likelihood of the substrate becoming charged during the manufacturing processes. Consequently, without spraying antistatic agent on the plastic parts such as the rotor, the fifth wheel-and-pinion, the fourth wheel-and-pinion, and the third wheel-and-pinion, there parts can be held by the chuck, and these parts can be reliably fitted into the substrate.

INDUSTRIAL APPLICABILITY

In the timepiece of the present invention, the substrate is formed from a filled resin having a base resin of thermoplastic resin and carbon fiber mixed with this base resin. Since this filled resin has conductivity, the main plate formed from the filled resin will not become charged. Therefore, due to the present invention, the plastic parts can be held by the chuck without spraying antistatic agent on the plastic parts such as the rotor, the fifth wheel-and-pinion, the fourth wheel-and-pinion and the third wheel-and-pinion. In the timepiece of the present invention, the plastic parts can be reliably fitted into the substrate Furthermore, in the timepiece of the present invention, when the plastic parts such as the rotor, the main plate, or the bridge are lubricated with lubricating oil (chronometer oil) using a lubricating unit, there is little likelihood of droplets of the lubricating oil not being adhered to the parts requiring the lubricating oil, for example, the bearings of the shaft or the bore, and being dispersed and adhered to the parts not requiring the lubricating oil, for example, the pinion section.

Moreover, in a wheel train of the present invention, without spraying antistatic agent on the gear wheels such as the fifth wheel-and-pinion, the fourth wheel-and-pinion, the third wheel-and-pinion, and an transfer wheel, these parts can be held by the chuck, and these parts can be reliably fitted into the substrate.

TABLE 1

| | | PA12 | | | POM | | PC | |
|---|---|---|---|---|---|---|---|---|
| | | VGCF | | | VGCF | | VGCF | |
| Item | Units | 20 wt % | 10 wt % | BLANK | 20 wt % | BLANK | 20 wt % | BLANK |
| Surface resistance | Ω/□ | $6.3 \times 10^3$ | $4.7 \times 10^{12}$ | $7.7 \times 10^{14}$ | | | | |
| Volume resistance | Ω · cm | $3.3 \times 10^3$ | $1.4 \times 10^{13}$ | $1.2 \times 10^{14}$ | $2.4 \times 10^0$ | $1 \times 10^{14}$ | $1.48 \times 10^3$ | $3 \times 10^{14}$ |

TABLE 2

| | PA12 | | POM | | PC | |
|---|---|---|---|---|---|---|
| | VGCF | BLANK | VGCF | BLANK | VGCF | BLANK |
| NOZZLE | 220° C. | 190° C. | 200° C. | 180° C. | 290° C. | 280° C. |
| FRONT SECTION | 230° C. | 200° C. | 210° C. | 185° C. | 310° C. | 290° C. |
| MIDDLE SECTION | 220° C. | 180° C. | 190° C. | 175° C. | 290° C. | 270° C. |
| BACK SECTION | 210° C. | 170° C. | 170° C. | 165° C. | 270° C. | 260° C. |
| MOLD TEMP. | 70° C. | 70° C. | 60° C. | 60° C. | 80° C. | 80° C. |

The invention claimed is:

1. A timepiece comprising:

a motor constituting a driving source, said motor including a rotor having a pinion section and a shaft section;

a gear wheel configured so as to rotate by rotation of said rotor, said gear wheel having a gear wheel section and a shaft section; and a substrate including a bearing section which rotatably supports the shaft section of said rotor and/or the shaft section of said gear wheel, wherein said substrate is formed from a metal or a plastic, said rotor and/or said gear wheel are formed from a filled resin having a base resin of thermoplastic resin and carbon fiber mixed with this base resin, and said carbon filler is selected from a group consisting of: a monolayer carbon nanotube, a multilayer carbon nanotube, a nanografiber, a carbon nano horn, a cup stack type carbon nanotube, a monolayer fullerene, a multilayer fullerene, and a mixture of any one of the carbon fillers doted with boron.

wherein said substrate is formed from a filled resin having a base resin of thermoplastic resin and carbon fiber mixed with this base resin, and said carbon filler is selected from a group consisting of: a monolayer carbon nanotube, a multilayer carbon nanotube, a nanografiber, a carbon nano horn, a cup stack type carbon nanotube, a monolayer fullerene, a multilayer fullerene, and a mixture of any one of the carbon fillers doped with boron.

2. A timepiece comprising:

a motor constituting a driving source, said motor including a rotor having a pinion section and a shaft section;

a gear wheel configured so as to rotate by rotation of said rotor, said gear wheel having a gear wheel section and a shaft section; and a substrate including a bearing section which rotatably supports the shaft section of said rotor and/or the shaft section of said gear wheel, wherein said substrate is formed from a filled resin having a base resin of thermoplastic resin and carbon fiber mixed with this base resin, and said carbon filler is a vapor grown carbon fiber with a diameter of 50 nm to 200 nm, and an aspect ratio of 10 to 1000.

3. A timepiece comprising:

a motor constituting a driving source, said motor including a rotor having a pinion section and a shaft section;

a gear wheel configured so as to rotate by rotation of said rotor, said gear wheel having a gear wheel section and a shaft section; and a substrate including a bearing section which rotatably supports the shaft section of said rotor and/or the shaft section of said gear wheel,

4. A timepiece comprising:

a spiral spring constituting a driving source;

a gear wheel configured so as to rotate with said spiral spring as the driving source, said gear wheel having a gear wheel section and a shaft section; and a substrate including a bearing section which rotatably supports the shaft section of said gear wheel, wherein said substrate is formed from a metal or a plastic, said rotor and/or said gear wheel are formed from a filled resin having a base resin of thermoplastic resin and carbon fiber mixed with this base resin, and said carbon filler is a vapor grown carbon fiber with a diameter of 50 nm to 200 nm, and an aspect ratio of 10 to 1000.

5. A timepiece comprising:

a spiral spring constituting a driving source;

a gear wheel configured so as to rotate with said spiral spring as the driving source, said gear wheel having a gear wheel section and a shaft section; and a substrate including a bearing section which rotatably supports the shaft section of said gear wheel, wherein said substrate is formed from a filled resin having a base resin of thermoplastic resin and carbon fiber mixed with this base resin, and said carbon filler is selected from a group consisting of; a monolayer carbon nanotube, a multilayer carbon nanotube, a nanografiber, a carbon nano horn, a cup stack type carbon nanotube, a monolayer fullerene, a multilayer fullerene, and a mixture of any one of the carbon fillers doped with boron.

6. A timepiece comprising:

a spiral spring constituting a driving source;

a gear wheel configured so as to rotate with said spiral spring as the driving source, said gear wheel having a gear wheel section and a shaft section; and a substrate including a bearing section which rotatably supports the shaft section of said gear wheel, wherein said substrate is formed from a filled resin having a base resin of thermoplastic resin and carbon fiber mixed with this base resin, and said carbon filler is a vapor grown carbon fiber with a diameter of 50 nm to 200 nm, and an aspect ratio of 10 to 1000.

7. A timepiece comprising:

a spiral spring constituting a driving source;

a gear wheel configured so as to rotate with said spiral spring as the driving source, said gear wheel having a gear wheel section and a shaft section; and a substrate including a bearing section which rotatable supports the shaft section of said gear wheel, wherein said substrate is formed from a metal or a plastic, wherein said gear wheel is formed from a filled resin having a base resin of thermoplastic resin and carbon fiber mixed with this base resin, and said carbon filler is selected from a group consisting of; a monolayer carbon nanotube, a multilayer carbon nanotube, a nanografiber, a carbon nano horn, a cup stack type carbon nanotube, a monolayer fullerene, a multilayer fullerene, and a mixture of any one of the carbon fillers doped with boron.

8. A timepiece comprising:

a spiral spring constituting a driving source;

a gear wheel configured so as to rotate with said spiral spring as the driving source, said gear wheel having a gear wheel section and a shaft section; and a substrate including a bearing section which rotatably supports the shaft section of said gear wheel, wherein said substrate is formed from a metal or a plastic, wherein said gear wheel is formed from a filled resin having a base resin of thermoplastic resin and carbon fiber mixed with this base resin, and said carbon filler is a vapor grown carbon fiber with a diameter of 50 nm to 200 nm, and an aspect ratio of 10 to 1000.

9. A timepiece according to any one of claim 1 through claim 8, wherein said base resin is selected from a group consisting of any one of; a polystyrene, a polyethylene terephthalate, a polycarbonate, a polyacetal (polyoxymethylene), a polyamide, a modified polyphenylene ether, a polybutylene terephthalate, a polyphenylene sulfide, a polyether ether ketone, and a polyether imide.

10. A wheel train apparatus including a gear wheel, a substrate, and a bearing member, comprising:

a gear wheel having a gear wheel section and a shaft section;

a substrate including a bearing section which rotatably supports one shaft section of said gear wheel; and a bearing member including a bearing section which rotatably supports an other shaft section of said gear wheel, wherein said substrate and said bearing member are formed from a filled resin having a base resin of thermoplastic resin and carbon fiber mixed with this base resin, and said carbon filler is selected from a group consisting of; a monolayer carbon nanotube, a multilayer carbon nanotube, a nanografiber, a carbon nano horn, a cup stack type carbon nanotube, a monolayer fullerene, a multilayer fullerene, and a mixture of my one of the carbon fillers doped with boron.

11. A wheel train apparatus including a gear wheel, a substrate, and a bearing member, comprising:

a gear wheel having a gear wheel section and a shaft section;

a substrate including a bearing section which rotatably supports one shaft section of said gear wheel; and a bearing member including a bearing which rotatably supports an other shaft section of said gear wheel, wherein said substrate and said bearing member are formed from a filled resin having a base resin of thermoplastic resin and carbon fiber mixed with this base resin, and said carbon filler is a vapor grown carbon fiber with a diameter of 50 nm to 200 nm, and an aspect ratio of 10 to 1000.

12. A wheel train apparatus including a gear wheel, a substrate, and a bearing member, comprising:

a gear wheel having a gear wheel section and a shaft section;

a substrate including a bearing section which rotatably supports one shaft section of said gear wheel; and a bearing member including a bearing which rotatably supports an other shaft section of said gear wheel, wherein said substrate is formed from a metal or a plastic, said bearing member is formed from a metal or a plastic, said gear wheel is formed from a filled resin having a base resin of thermoplastic resin and carbon fiber mixed with this base resin, and said carbon filler is selected from a group consisting of; a monolayer carbon nanotube, a multilayer carbon nanotube, a nanografiber, a carbon nano horn, a cup stack type carbon nanotube, a monolayer fullerene, a multilayer fullerene, and a mixture of any one of the carbon fillers doped with boron.

13. A wheel train apparatus including a gear wheel, a substrate, and a bearing member, comprising:

a gear wheel having a gear wheel section and a shaft section;

a substrate including a bearing section which rotatably support one shaft section of said gear wheel; and a bearing member including a bearing which rotatably supports an other shaft section of said gear wheel, wherein said substrate is formed from a metal or a plastic, said bearing member is formed from a metal or a plastic, said gear wheel is formed from a filled resin having a base resin of thermoplastic resin and carbon fiber mixed with this base resin, and said carbon filler is a vapor grown carbon fiber with a diameter of 50 nm to 200 nm, and an aspect ratio of 10 to 1000.

14. A wheel train apparatus according to any one of claim 10 through claim 13, wherein said base resin is selected from a group consisting of any one of; a polystyrene, a polyethylene terephthalate, a polycarbonate, a polyacetal (polyoxyethylene), a polyamide, a modified polyphenylene ether, a polybutylene terephthalate, a polyphenylene sulfide, a polyether ether ketone, and a polyether imide.

* * * * *